United States Patent
Xue et al.

(10) Patent No.: US 10,567,566 B2
(45) Date of Patent: Feb. 18, 2020

(54) METHOD AND APPARATUS FOR PROVIDING MECHANISM TO CONTROL UNATTENDED NOTIFICATIONS AT A DEVICE

(71) Applicant: Nokia Technologies Oy, Espoo (FI)

(72) Inventors: Wenwei Xue, Beijing (CN); Likhang Chow, Beijing (CN)

(73) Assignee: Nokia Technologies Oy, Espoo (FI)

( * ) Notice: Subject to any disclaimer, the term of this patent is extended or adjusted under 35 U.S.C. 154(b) by 248 days.

(21) Appl. No.: 14/421,244

(22) PCT Filed: Oct. 16, 2012

(86) PCT No.: PCT/CN2012/083042
§ 371 (c)(1),
(2) Date: Feb. 12, 2015

(87) PCT Pub. No.: WO2014/059608
PCT Pub. Date: Apr. 24, 2014

(65) Prior Publication Data
US 2015/0207916 A1    Jul. 23, 2015

(51) Int. Cl.
*H04W 68/00* (2009.01)
*H04M 1/725* (2006.01)
*H04W 8/00* (2009.01)
*H04W 8/22* (2009.01)

(52) U.S. Cl.
CPC ....... *H04M 1/72522* (2013.01); *H04W 8/005* (2013.01); *H04W 8/22* (2013.01); *H04W 68/00* (2013.01)

(58) Field of Classification Search
CPC .... H04M 1/72522; H04L 51/24; H04L 67/18; H04L 67/24; H04W 4/12; H04W 4/20; H04W 8/005; H04W 8/22; H04W 68/00
See application file for complete search history.

(56) References Cited

U.S. PATENT DOCUMENTS

2005/0160261 A1* 7/2005 Barry .................... H04W 8/005
                                                                 713/164
2006/0035632 A1* 2/2006 Sorvari ............. H04M 1/72552
                                                                 455/418

(Continued)

FOREIGN PATENT DOCUMENTS

| CN | 101917680 A | 12/2010 |
| CN | 101945361 A | 1/2011 |
| CN | 102098628 A | 6/2011 |

OTHER PUBLICATIONS

International Search Report and Written Opinion received for corresponding Patent Cooperation Treaty Application No. PCT/CN2012/083042, dated Jul. 25, 2013, 10 pages.

*Primary Examiner* — Sam Bhattacharya
(74) *Attorney, Agent, or Firm* — Ditthavong & Steiner, P.C.

(57) ABSTRACT

An approach is provided for providing mechanisms to control unattended notifications at a device. The approach includes determining that at least one notification presented at a device is an unattended notification. The approach also includes causing, at least in part, a presentation of one or more mechanisms for controlling the unattended notification at the device, one or more other devices, or a combination thereof.

18 Claims, 13 Drawing Sheets

(56) References Cited

U.S. PATENT DOCUMENTS

| | | | | |
|---|---|---|---|---|
| 2007/0037605 A1* | 2/2007 | Logan | .................... | H04W 4/12 |
| | | | | 455/567 |
| 2007/0202884 A1* | 8/2007 | Nykanen | ................ | H04L 67/02 |
| | | | | 455/455 |
| 2008/0009327 A1* | 1/2008 | Westwood | ........ | H04M 1/72522 |
| | | | | 455/567 |
| 2008/0107250 A1* | 5/2008 | Peuziat | ................ | H04W 76/02 |
| | | | | 379/142.01 |
| 2009/0100497 A1* | 4/2009 | Goldberg | ................ | H04L 51/04 |
| | | | | 726/1 |
| 2010/0144324 A1* | 6/2010 | Wright | ................... | H04W 4/16 |
| | | | | 455/414.1 |
| 2011/0026704 A1* | 2/2011 | Connelly | ................ | H04L 67/16 |
| | | | | 379/219 |
| 2011/0076989 A1* | 3/2011 | Lynch | .............. | H04M 1/72547 |
| | | | | 455/412.1 |
| 2011/0171937 A1* | 7/2011 | Hill | ...................... | H04M 19/04 |
| | | | | 455/412.2 |
| 2013/0165185 A1* | 6/2013 | Guo | ....................... | H04W 4/12 |
| | | | | 455/566 |
| 2013/0244579 A1* | 9/2013 | Hohteri | ................ | H04W 76/14 |
| | | | | 455/41.2 |

* cited by examiner

METHOD AND APPARATUS FOR PROVIDING MECHANISM TO CONTROL UNATTENDED NOTIFICATIONS AT A DEVICE

RELATED APPLICATION

This application was originally filed as Patent Cooperation Treaty Application No. PCT/CN2012/083042 filed Oct. 16, 2012.

BACKGROUND

Service providers and device manufacturers (e.g., wireless, cellular, etc.) are continually challenged to deliver value and convenience to consumers by, for example, providing compelling network services. In general, users may utilize a range of devices (e.g., mobile phones, tablets, etc.) for various purposes throughout a day, for example, for communications, entertainment, tasks, and the like, where each device and its applications may utilize different methods to generate one or more notifications to alert a user of an event. For example, a device may generate one or more notifications (e.g., audio, vibration, flashing light, etc.) associated with an incoming communication (e.g., a phone call, an instant message (IM), etc.), an application (e.g., a gaming application, a calendar, etc.). In many instances, the users may utilize the devices in an environment where there may be other users, for example, in an office, in a restaurant, at home, at a library, etc., wherein the presented notifications at a device may also be observed (e.g., heard, seen, etc.) by other users within close proximity. Therefore, service providers and device manufacturers face significant challenges in providing mechanisms for control of notifications.

SOME EXAMPLE EMBODIMENTS

Therefore, there is a need for an approach for providing mechanisms to control unattended notifications at a device.

According to one embodiment, a method comprises determining that at least one notification presented at a device is an unattended notification. The method also comprises causing, at least in part, a presentation of one or more mechanisms for controlling the unattended notification at the device, one or more other devices, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine that at least one notification presented at a device is an unattended notification. The apparatus is also caused to cause, at least in part, a presentation of one or more mechanisms for controlling the unattended notification at the device, one or more other devices, or a combination thereof.

According to another embodiment, a computer-readable storage medium carries one or more sequences of one or more instructions which, when executed by one or more processors, cause, at least in part, an apparatus to determine that at least one notification presented at a device is an unattended notification. The apparatus is also caused to cause, at least in part, a presentation of one or more mechanisms for controlling the unattended notification at the device, one or more other devices, or a combination thereof.

According to another embodiment, an apparatus comprises means for determining that at least one notification presented at a device is an unattended notification. The apparatus also comprises means for causing, at least in part, a presentation of one or more mechanisms for controlling the unattended notification at the device, one or more other devices, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing mechanisms to control unattended notifications at a device.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "notification" refers to any alerts for notifying one or more users and/or one or more devices of an occurrence of one or more events. Further, the notification may be utilized in combination with an alert, "a notification alert," a message, "a notification message," and the like, where a notification may include various, aural, visual, haptic, and/or silent alerts. Typically, the notifications may be caused by various applications, modules, sensors, and/or services on or external to a device. For example, a notification alert on a device may be due to an incoming phone call, an IM, a short message service (SMS), a calendar reminder, an alarm setting on a clock, a gaming application, a device condition, from a service provider, and the like.

Additionally, the term "restless device" refers to a device wherein one or more notifications are unattended (e.g., an incoming phone call is not answered, a calendar reminder is not acknowledged, etc.) Further, when referring to "controlling a restless device," it is also to be understood, at least, as "controlling an unattended notification."

Figure 1:
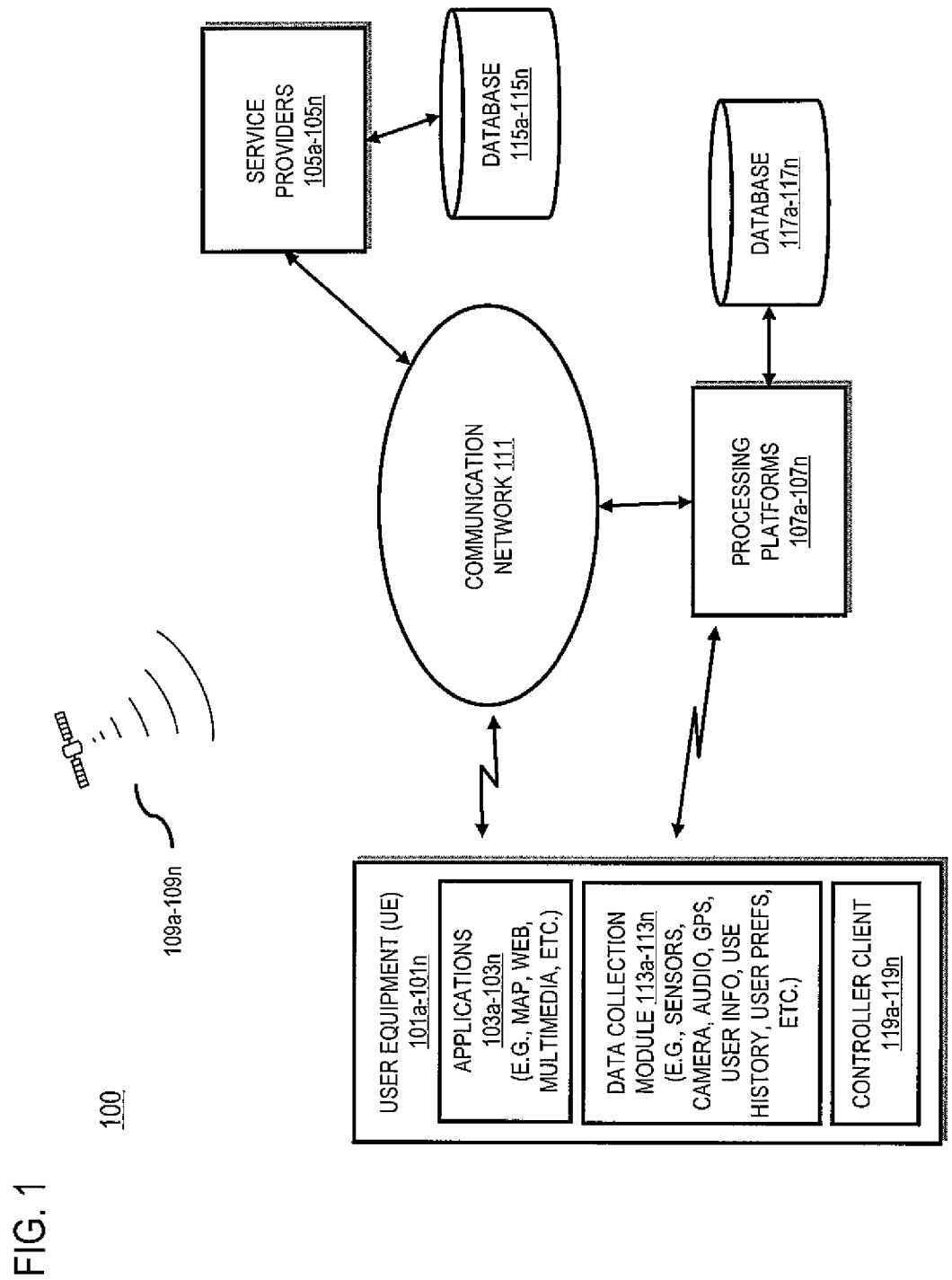
FIG. 1 is a diagram of a system capable of providing mechanisms to control unattended notifications at a device, according to an embodiment.

FIG. 1 is a diagram of a system capable of providing mechanisms to control unattended notifications at a device, according to an embodiment. As mentioned, users may utilize a range of devices for various purposes; for example, for communications, for entertainment, for productivity, and the like, wherein the devices may be utilized at various places, for instance, at home, at office, at a library, in a restaurant, in a coffee shop, and the like. In various instances, a user may utilize a device to receive phone calls, IMs, emails, newsfeeds, etc., utilize applications for playing games, social networking, tracking tasks (e.g., calendar, alarms, etc.), etc. Further, various applications and/or modules on the devices may utilize various methods to provide feedback and/or trigger notifications to the users, for example, ringing tones, flashing lights, vibration, and the like, wherein each notification may request for one or more actions from a user and/or an application before the notifications are stopped. In various instances, the applications and/or the devices may have various configurations, user profiles, user preferences, device capabilities, etc. for generating various notifications, for example, an application may cause playing of a musical tone and flashing lights on a device every time there is an incoming phone call. However, for various reasons, a user of may be unable to attend to one or more notifications at one or more devices, for example, the user may be away from the one or more devices (e.g., in another room), or the user may be busy with another task (e.g., on a phone call on another device), or the user may be unaware of the notification (e.g., the user has earplugs on and cannot hear a device ringing), where in some cases the notification may persist and cause nuisance, disturbance, and annoyance to people/neighbors (other users) in a close proximity (neighborhood). For example, in an office area there may multiple users with multiple devices where it is possible that a few devices may cause multiple unattended notification alerts (e.g., restless devices), which may easily disturb and annoy other nearby users. In one instance, there may be multiple incoming phone calls at a device (e.g., from one or more parties) when user of the device is unable to attend to resulting notifications (unattended notifications), wherein the device is playing loud audio tones (e.g., musical clips) and is vibrating on a desk thereby disturbing others in the neighborhood.

To address, at least these problems, a system 100 of FIG. 1 introduces the capability of providing mechanisms to control unattended notifications at a device. In general, users utilize various devices having different capabilities and applications for a range of services and processes (e.g., communications, entertainment, productivity, etc.), wherein the devices may be capable of generating a range of notification alerts to one or more users. At times, the notification alerts may stop gracefully, for example, when a user attends to the notification alert (e.g., answers an incoming phone call), or the source causing the notification alert stops the causing (e.g., an application stops triggering a notification, a calling party stops calling, etc.) However, at times, a user may not wish or may be unable to attend to the notifications, which may continue for some time and hence disturb/annoy others in the neighborhood. Further, the notifications on a device may be, for instance, due to communications (e.g., phone calls, IMs, SMS, chat session requests, etc.) from one or more parties (e.g., a persistent caller), one or more pending actions/tasks, one or more applications (e.g., games), one or more reminders (e.g., via a calendar application), and the like. For example, users A, B, C, and D are working nearby in neighboring cubicles, where user A is absent, but one or more of his devices (e.g., a mobile phone, a tablet, a gaming device, etc.) are on his desk. Further, there is a notification alert (e.g., ringing) at one of the user A devices due to an incoming phone call, but no one attempts to utilize the device for responding to the notification, and the notification alert stops (e.g., incoming phone call stops).

Furthermore, soon there is another notification (e.g., another incoming phone call, a calendar alert, etc.) on one or more of the user A devices. At this point, the unattended notification alerts interrupt, annoy, and disturb the B, C, and D users and/or others within a close spatial proximity of the user A devices, when the user A devices are considered to be restless, offending, annoying, and the like devices. It is noted that it is possible that the one or more user A devices may be locked and/or that the other users may not be authorized to utilize the user A devices, or to respond to a notification, or to disable the devices, etc. The system 100 provides the ability for other users and/or devices in the neighborhood and/or a third party (e.g., a service provider) to control the notification alerts on a restless device, for example, when a user of the restless device is unable and/or unwilling to control the notification alerts.

In one embodiment, notifications on a restless device may be controlled via one or more other devices substantially without physically handling the restless device. In one embodiment, notifications on a restless device may be controlled via one or more user interface (UI) elements presented at the restless device.

In one embodiment, a restless device and one or more other devices may communicate with each other via one or more peer-to-peer (P2P) based local communication channels, for example, to communicate the control mechanisms, associated parameters, information, and the like. In one embodiment, one or more service providers (e.g., local, remote, etc.) may facilitate communication of the control mechanisms, associated parameters, information, and the like. In one embodiment, the one or more service providers may facilitate controlling of one or more notifications on a restless device, for example, in collaboration with the restless device and/or one or more other devices. In one embodiment, the system 100 may create an ad hoc network, including one or more restless devices and one or more other devices, for sharing context information and messages, discovering devices, performing one or more processes, and the like, including one or more queries over the ad-hoc network, forming neighborhoods, zones, communities, groups, etc. for controlling and/or coordinating control of one or more notifications on one or more devices.

In one embodiment, a first device may determine that one or more notifications at the first device may be unattended and/or may cause, at least in part, the first device to become a restless device, wherein the first device may provide and/or accept one or more mechanisms for controlling the one or more unattended notifications. For example, the first device receives multiple phone calls from one or more sources within a certain period of time, wherein the notifications are unattended (e.g., user is absent) and may disturb and annoy other nearby users and/or devices. Further, the first device provides and/or accepts one or more mechanisms, for example, from one or more other devices/users (e.g., neighboring) for controlling the unattended notifications.

In one embodiment, user may manually and/or temporarily disable neighborhood control of his device (e.g., a restless device), for example, by an indicator tag in one or more applications and/or at one or more service provider configurations. In various embodiments, a substantially automatic and/or context-based on/off switching of a neighborhood control mechanism may be effectuated by a first user and/or a first user device. In various scenarios, one or more configurations may allow/disallow a neighboring user/device to control a restless device according to various situations of the restless device; for example, allow control when restless device at work, but disallow when at home; or allow control by friends of the user, but not by strangers; or allow control by user's manager, but not by colleagues or staff; or allow control by another device/user if the restless user/device has previously controlled the other device; or allow control only if there is a baby nearby (e.g., baby may be detected by audio recognition of baby crying via a device microphone, by image recognition via camera, etc.)

In various embodiments, controlling of a restless device may be accomplished, at least in part, by utilizing various points/credits, for example, via one or more service providers (e.g., social networking services, mobile service providers, etc.) For example, a user, a device, and/or a service provider may request for various credits/points (e.g., as a reward) from other devices/users in order to allow a device (e.g., a restless) to be controlled by the other devices, users, and/or service providers, wherein the credits/points may be determined based, at least in part, on a requested control mechanism, context of a modification of a restless device, and the like.

In various embodiments, the system 100 provides privacy and security protection for an unattended/restless device while providing the mechanisms to control unattended notifications at unattended/restless device. For example, content at the unattended/restless device may be substantially limited and/or blocked from being accessed, utilized, and/or viewed by other users and/or devices. In one embodiment, only device resources for controlling an unattended notification may be made available to one or more other devices, users, service providers, and the like. Further, a restless device may be anonymous to other users and/or devices while known to certain other users and/or devices (e.g., family, friends, etc.) For example, user of a neighboring device may notice one or more unattended notifications at a restless device and provide control to the restless device substantially without knowing identify of the restless device and/or of its user's. Further, a neighboring device/user that provides control to a restless device may be anonymous to the restless device. Furthermore, one or more controlling devices/users may be prevented from turning off a restless device, alter other configurations and/or content on the restless device, for example, only change a current notification method at the restless device. Moreover, various messages associated with the restless condition of a restless device may be presented to and/or accessed by a user of the restless device.

In one embodiment, the system 100 determines that at least one notification presented at a device is an unattended notification. In one embodiment, one or more notifications may be triggered at a device where the notifications may be caused, for example, by one or more incoming communication requests, one or more applications (e.g., calendar, clock, games, etc.), one or more service providers, and the like. Further, one or more applications and/or modules at the device, at one or more other devices, at a service provider, and the like may determine that the one or more notifications on the device are unattended, for example, a user of the device is not responding to the one or more notifications (e.g., user is busy, user is absent, etc.) Furthermore, the one or more applications and/or modules may utilize one or more parameters and methods to determine that the device presenting the one or more unattended notifications is a restless device. In one embodiment, the one or more parameters may indicate that within a system-defined time period, ($T_a$), one or more notifications triggered by one or more sources (e.g., a caller, an application, etc.) have been unanswered/unattended for at least a total time length of ($T_r$), where ($T_r<T_a$), for example, aggregated notification time from the one or more sources has lasted for ($T_r$) within ($T_a$) when the one or more notifications have remained unattended/unanswered. In various embodiments, values for ($T_r$) and/or ($T_a$) may be set according to the one or more sources, one or more notification types, device type, user preferences, and the like. In one embodiment, values of ($T_r$) and/or ($T_a$) may be static and/or may be manually defined by one or more users. In one embodiment, the values may be dynamically defined based, at least in part, on a particular source of one or more notifications, for example, a caller's or a caller-group's context data which may include historical "restless behaviors", user and/or device profiles, social relationships with a user of the restless device, current location information of the restless device, and the like. For example, it may take a longer time for a device to become restless if a source of one or more unattended notifications is a previously less restless source (e.g., friend). In one embodiment, a ratio $\tau=(T_r)/(T_a)$ which may be increased by increasing ($T_r$) while ($T_a$) is substantially constant, or by decreasing ($T_a$) while ($T_r$) is substantially constant, wherein this may result for a device and/or a source of the one or more notifications to take longer or shorter time before determined as restless.

In one embodiment, the system 100 causes, at least in part, a presentation of one or more mechanisms for controlling the unattended notification at the device, at one or more other devices, or a combination thereof. In various embodiments, one or more restless devices, one or more other devices, and/or a service provider may cause presentation of the one or more mechanisms at the one or more restless devices and/or at the one or more devices whereby a user and/or one or more devices may control the one or more unattended notifications at the restless device. In one embodiment, a UI may be presented as a component of a control mechanism at a restless device whereby a user may interact with the device to control a notification, for example, turn-off the notification, change the notification type (e.g., effect, volume, etc.), forward the notification to another device (e.g., from a mobile phone to a tablet) for a user of the restless device, one or more other users, and the like. In one embodiment, one or more control mechanisms may be presented at one or more other devices whereby one or more users may utilize the one or more other devices for controlling one or more notifications and/or one or more restless devices. For example, a device "A" is restless and a mechanism for controlling the device "A" is presented at a device "B" where a user of device "B" (e.g., via UI elements) and/or one or more applications at the device "B" may utilize the mechanism to send one or more controlling messages, for example, directly to the device "A," via one or more other devices, and/or via one or more service providers. In one embodiment, a restless device may utilize one or more mechanism to substantially control the unattended notifications at the restless device without assistance from a service provider, other devices, and/or users. In one embodiment, one or more neighboring devices may ignore a nearby restless device, wherein the restless device may or may not utilize the one or more mechanism for controlling one or more unattended notifications. In one embodiment, the one or more mechanisms may be utilized to provide for one or more hybrid control mechanisms whereby a restless device may substantially simultaneously be controlled via the restless device (e.g., a UI) and via one or more other devices.

In one embodiment, the system 100 causes, at least in part, an establishment of at least one communication session between the device and the one or more other devices, wherein the one or more mechanisms operate, at least in part, over the at least one communication session. In one embodiment, the at least one communication session is a P2P communication session via, for example, Bluetooth®, Wi-Fi direct, infrared (IR), wireless local area network (WLAN), and/or other short range communication methods. In one embodiment, one or more devices in a close proximity (e.g., a neighborhood) may utilize one or more mechanism to determine presence of one or more other devices in close proximity, wherein a list of present devices may be stored, updated, utilized, and the like via one or more devices and/or one or more service providers (e.g., cloud services).

In one embodiment, the system 100 determines that the at least one notification is an unattended notification based, at least in part, on a repetition of the at least one notification, a duration of the at least one notification, or a combination thereof. In one embodiment, one or more applications and/or one or more modules at one or more devices, and/or one or more service providers may utilize one or more sensors to determine one or more notifications, for example, aural, visual, vibration, and the like at a device, wherein the one or more notifications may be determined to be unattended if the one or more notifications persist and/or repeat over a predetermined time period. In various embodiments, the predetermined time period may be based, at least in part, on one or more user preferences, use history, neighborhood information, device capabilities, service provider configurations, notification frequency, notification type, and the like. In one embodiment, one or more notifications (e.g., phone calls, IM, SMS, alerts, etc.), may be caused and repeated by one source/application/module where the one or more notifications may be of one or more types (e.g., audio, visual, vibrate, etc.). For example, there are five unattended notifications from a same party due to five communication attempts, for instance, three incoming phone calls, one IM session, and one SMS message, where the five unattended notifications may repeat over a certain time period.

In one embodiment, the system 100 processes and/or facilitates a processing of one or more messages associated with the at least one notification from the one or more other devices. In one embodiment, one or more other devices and/or other users may generate/create one or more messages in response to one or more notifications observed at a device. For example, the one or more messages may include information related to the one or more notifications observed at the device, for instance, a type of notification, duration of notification, notification source, like/dislike messages from the one or more other users related to the one or more notifications and/or the device, and the like.

In one embodiment, the system 100 causes, at least in part, a presentation of one or more of the one or more messages to one or more users of the device based, at least in part, on the repetition of the at least one notification, the duration of the at least one notification, or a combination thereof. In one embodiment, the one or more messages may be presented to one or more users of the device which is producing the one or more notifications. For example, the one or more messages may be presented (e.g., email, SMS, IM, etc.) to a user of the device via another device associated with the user, via a service provider (e.g., a social networking service), and the like to remind/indicate to the user that the user's device has become restless and is disturbing other neighboring users/devices.

In one embodiment, the system 100 determines that the at least one notification is an unattended notification based, at least in part, on presence information, proximity information, or a combination thereof of one or more users associated with the device. In one embodiment, location information of a user in relation to a device of the user is utilized to determine whether one or more notifications at the device are unattended. For example, a user may be away from his device, or may be nearby, may be next to the device, etc. In various embodiments, one or more parameters, user preferences, neighborhood and/or service provider configurations, and the like may utilize the location information to indicate that one or more notifications at the device are unattended. For example, if a user is at a certain distance from the device, a notification may be determined unattended. In various, embodiments, one or more information items from one or more sensors, for example, GPS, radar, surveillance cameras, facial recognition, microphone, user bodily worn devices (e.g., a headset), and the like may be utilized to determine proximity and/or presence of a user and an associated device.

In one embodiment, the system 100 determines that the at least one notification is an unattended notification based, at least in part, on contextual information associated with an initiator of the at least one notification, the device, the one or more other devices, or a combination thereof. In various embodiments, one or more information items related to one or more sources/initiators of one or more notifications at a device are determined and utilized for, at least in part, determining if the one or more notifications at a device are unattended. For example, if the source/initiator of a notification is determined to be an important person (e.g., spouse, supervisor, etc.) and/or event associated with user of the device, then the notification maybe will not be identified as unattended. In one example, if a device which is producing a notification is associated with a certain user (e.g., spouse, supervisor, etc.), then may be the notification will not to be determined as unattended. In one example, if a device producing a notification is in close proximity to a certain device (e.g., a supervisor's device), then the notification may be quickly determined as unattended. In various use scenarios, the contextual information may be utilized by a first user to specify/cause one or more actions; for instance, a) change the notification mode to vibration if the restless device is the first user's child's phone, b) send to a user of a restless device an email if the restless device is the first user's colleague's phone, c) change a notification ringtone to a musical tone if the restless device has rarely been identified as a restless device, otherwise submit a dislike vote to a service provider and/or a user of the restless device, d) mute a notification alert call if the first user is in a meeting and the user of the restless device is also in the same meeting (e.g., according to a calendar entry on the restless device), e) mute a notification alert if the first user is in a reading room and the restless device is also in the same room (e.g., according to location information), f) turn down the notification alert volume to a certain level (e.g., 20% of the full volume) if distance between the restless device and a first user/user device is, for example, less than 10 feet, or to 30% if the distance is between 10 and to 15 feet, or otherwise to 50%. In one example, 10 seconds after a dislike vote, if an unattended notification continues, change the notification mode to vibration, and after 10 more seconds if the vibration still continues, change the notification mode to on-screen flashing without audio or vibration.

In various embodiments, one or more parameters, for example ($T_r$) and/or ($T_a$), may be utilized to configure one or more conditions, at least in part, for a device to become a restless device. For example, one or more configurations may provide for a longer time before the spouse or the supervisor to cause a device to become restless when compared to friend. In one example, it may take a longer time before a colleague may cause a device to become restless, if he makes one or more phone calls from a work place when compared to his place of residence. In one example, it may take a shorter time before a colleague may cause a device to become restless, if he makes one or more phone calls from a same location as one or more phone calls made by another common colleague within a certain time period. In one embodiment, the time for a device to be determined as a restless device may, at least in part, depend on a notification type setting; for example, a longer time if a current notification type is set as ringing at a volume of 50% of the full volume, or even a longer time if the ringing volume is set 30%, or a substantially longer time if the setting is such that it does not ring and only vibrates, or the device may never be determined to be restless if the ringing setting is at "mute" without vibration (e.g., in a silent mode.)

In use case scenario, a restless device may have a multiple of neighboring devices, for example three, where users of the multiple devices may have indicated via one or more parameters (e.g., configurations, messages, etc.) that they may tolerate a ringing notification at a nearby devices for 20, 30, and 60 seconds. Further, the parameters may be aggregated by the restless device, for example via an ad-hoc P2P transmission, and/or a service provider where the value of ($T_r$) may be set an aggregated value of the neighbor tolerance limits (e.g. average of 37 seconds, minimum of 20 seconds, median of 30 seconds, etc.) In one embodiment, one or more users may specify one or more configuration limits (e.g., ringing duration, ringing volume, etc.) for nearby restless devices, wherein the configuration limits may be stored, maintained, and/or utilized by a service client. In one embodiment, spatial size of a neighborhood, one or more zones in the neighborhood, the number of other devices/users in the neighborhood, and the like may be utilized, at least in part, in determining when a device may be identified as a restless device. For example, it may take a shorter time for a device to be identified as a restless device if the neighborhood includes a larger spatial area with a large number of other devices.

In one embodiment, the system 100 causes, at least in part, a presentation of one or more parameters for effectuating the at least one notification based, at least in part, on the at least one notification, one or more capabilities of the device, one or more user profiles at the devices, one or more user profiles at the one or more other devices, one or more social connectivity among the device and the one or more other devices, or a combination thereof. For example, the one or more notifications at a device (e.g., a restless device) may be modified by one or more users, one or more other devices, one or more service providers, and the like based on one or more capabilities of the device to produce one or more types of notifications, for instance, musical tones, vibration, flashing lights, higher/lower audio volume, ringing tones, and the like. In one embodiment, the one or more notifications may be modified based on a user profile, preferences, and/or configurations at the device. In one embodiment, the notifications may be modified based on a social connectivity/relationship among the device/user and one or more other users/devices. For example, the devices are in an office area, the users are employees of a same employer, the users are members of a same family, and the like. In one embodiment, the one or more parameters may include one or more gaming elements, one or more social networking elements, one or more entertainment elements, one or more informative elements, and the like. In one embodiment, one or more modifications to one or more unattended notifications at a restless device may be for a limited time based, at least in part, one or more configurations at the restless device, at the one or more other devices, at a service provider, and the like. In one embodiment, a restless device may utilize one or more prior control mechanisms and/or settings to control one or more current and/or future notifications.

In one embodiment, the system 100 causes, at least in part, a discovery of the one or more other devices using one or more local connectivity on an initiation of a presentation of the at least one notification. In one embodiment, one or more devices and/or service providers may utilize one or more short range and/or local connectivity (e.g., to a local server) services to discover one or more other devices in close proximity, wherein the discovery may be based, at least in part, on one or more notifications (e.g., ringing, vibrating, flashing light, etc.) triggered at a device. In one embodiment, the discovery is based, at least in part, on one or more probe messages exchanged between the device and the one or more other devices. In one example, the device producing a notification may cause, at least in part, a probing message for discovery of the one or more other devices. In one example, the one or more other devices may utilize one or more sensor information to detect a notification at the device and cause, at least in part, one or more probing messages for discovering the device producing the notification. In one embodiment, the discovery is based, at least in part, on location information associated with the device and the one or more other devices. In one embodiment, a device and one or more other devices may be located in a neighborhood, in one or more zones within the neighborhood, and the like. In one embodiment, the discovery is based, at least in part, one or more audio signals broadcast among the device and the one or more other devices. For example, the device and/or the one or more other devices may provide and/or detect one or more audio signals produced based, at least in part, on one or more notifications at the device, at the one or more other devices, and the like. In one embodiment, the one or more audio signals include, at least in part, one or more inaudible audio signals. For example, the one or more audio signals may include one or more components that may be inaudible by users (e.g., outside of user hearing range, frequency, level, etc.), which may still be detected by the device and/or the one or more other devices. In one embodiment, the inaudible audio signals may be produced by one or more devices while in a silent mode.

In one embodiment, the system 100 determines a radius including one or more zones within a proximity of the device, the one or more devices, or a combination thereof. In one embodiment, a device, one or more other device, a service provider, one or more users, and the like may determine a space between the device and the one or more other devices, wherein the space may include one or more zones. For example, an office area may include several devices of which a first device may be producing one or more notifications. Further, one or more zones may be determined in relation to the device and the one or more other devices within the office area. In one example, the space may include other devices that may at an audio range, but not at a visual range and/or line of sight.

In one embodiment, the system 100 causes, at least in part, a classification of the one or more devices based, at least in part, on the one or more zones. In one embodiment, the one or more zones may include one or more devices/users, wherein the one or more devices/users may be classified (e.g., prioritized) based, at least in part, on the zone wherein the one or more devices/users are located in. For example, a first device may be in a zone which is right next to a restless device producing a notification, where the first device may be classified as being at a close proximity (e.g., zone-1).

In one embodiment, the system 100 causes, at least in part, an assignment of one or more authorizations to the one or more devices based, at least in part, on the classification, the one or more zones, or a combination thereof. In one embodiment, the one or more other devices may be assigned one or more authorizations for controlling one or more notifications at a device based, at least in part, on a classification and/or a zone associated with the one or more devices. For example, a zone next to a restless device zone may be assigned a high priority zone and a device within the high priority zone may be assigned a higher level of authorization for controlling one or more notifications at the restless device.

In one embodiment, the system 100 causes, at least in part, an aggregation of one or more modification commands. In one embodiment, one or more modification commands from one or more devices, one or more service providers, and the like may be aggregated, for example, by the one or more devices, the one or more service providers, and the like, wherein the one or more modification commands may include one or more parameters, one or more configurations, one or more preferences, one or more settings, and the like. In one embodiment, the one or more modification commands may be utilized, at least in part, for modifying and/or controlling one or more notifications at one or more devices. For example, a modification command may request that a notification alert type be changed from an audio alert to a vibration alert, or from a change the audio alert level to a certain level, or stop a flashing-light alert, and the like. In various embodiments, multiple devices in an ad-hoc neighborhood may view and attempt to control a restless device, wherein one or more control messages/commands from the multiple devices may cause one or more conflicts where the restless device and/or an aggregation point (e.g., a service provider, a server, etc.) may select/execute a "first-arrived" control message, or after the first control message is received, the restless device may wait for a system-defined time period ($T_d$) to determine if there may be other potential subsequent control messages. Further, after the ($T_d$), the restless device may broadcast a restless termination message to the one or more other devices (e.g., neighboring devices). In one embodiment, one or more portions of one or more control messages/commands/configurations may be utilized to determine one or more parameters for modifying one or more notifications at a restless device.

In one embodiment, the system 100 causes, at least in part, an execution of the one or more modification commands based, at least in part, on the one or more classifications, the one or more authorizations, or a combination thereof. In one embodiment, a device producing one or more notification alerts may execute one or more medication commands for modifying the one or more notification alerts based, at least in part, one or more classifications associated with the one or more modification commands and/or one or more sources of the one or more modification commands. For example, a classification may be associated with a certain device which is in a certain zone and/or at a certain proximity with reference to a restless device, or the classification may be associated with a user of a device providing a modification command, or the classification may be associated with a service provider, and the like. In one embodiment, a modification command may be associated with an authorization, which may be associated with one or more devices, one or more users, one or more service providers, and the like. In one embodiment, the execution of the one or more modification commands is based, at least in part, on a ranking, a rating, a voting, or a combination thereof associated with the one or more modification commands In various embodiments, the one or more modification requests may be associated with one or more rankings, ratings, votings, and the like, which may be determined based, at least in part, one or more information items by one or more users, one or more devices, one or more service providers, and the like. For example, a user may vote to modify a notification alert on a device (e.g., a restless device) to a different type of notification, or may rank one or more notifications (e.g., currently in use, proposed, suggested, etc.), or may rate the one or more modifications, and the like. In one embodiment, the execution of the one or more modification commands is based, at least in part, on one or more thresholds at the device, at the one or more other devices, or a combination thereof. In one embodiment, the one or more thresholds may include one or more parameters associated with the one or more notifications types (e.g., audio, vibrate, flashing lights, etc.), intensity level (e.g., level of audio, vibration, flashing light, etc.), frequency (e.g., how many times in a certain time period), source (e.g., person, application, etc.), duration (e.g., how long), and the like. In one embodiment, the one or more thresholds may be defined by one or more users, one or more devices, one or more service providers, one or more applications, and the like.

As discussed above, the system 100 may provide various benefits and advantages to the users utilizing the methods of the system 100. For example, the system 100, at least, provides mechanisms to discover unattended notifications at a device, determine that a device is restless, and enable neighboring devices and/or users to control the unattended notification and/or the restless device. Further, the mechanism provides for a restless device to substantially automatically self-control one or more unattended notifications at the restless device before and/or after the device is determined to be a restless device. Furthermore, the system 100 provides for communication messages to be exchanged among a restless device, a controlling device, a user of the restless device, a user a controlling device, a local and/or remote service provider, and/or various components of the system 100.

As shown in FIG. 1, in one embodiment, the system 100 may include user equipment (UE) 101a-101n (also collectively referred to as UE 101 and/or UEs 101), which may be utilized to execute one or more applications 103a-103n (also collectively referred to as applications 103) including social networking, web browser, multimedia applications, user interface (UI), map application, web client, etc. to communicate with other UEs 101, one or more service providers 105a-105n (also collectively referred to as service providers 105), one or more processing platforms 107a-107n (also collectively referred to as processing platform 107), one or more GPS satellites 109a-109n (also collectively referred to as GPS satellites 109), and/or with other components of the system 100 directly and/or via communication network 111. In one embodiment, the UEs 101 may include data collection modules 113a-113n (also collectively referred to as data collection module 113) for determining and/or collecting data and/or content associated with the UEs 101, one or more users of the UEs 101, applications 103, one or more content items (e.g., multimedia content), and the like.

In one embodiment, the UEs 101 may include one or more controller modules 119a-119n (also collectively referred to as controller client 119) for determining and/or controlling one or more unattended notifications on one or more devices (e.g., restless devices), wherein the determination and/or the controlling may be done in conjunction with one or more other UEs 101, the processing platform 107, the service providers 105, the applications 103, the data module 113, and the like. For instance, a controller client 119 may interact with the applications 103, other modules of a UE 101, and/or a user for performing one or more tasks/functions in order to determine one or more information items for identifying and/or controlling one or more unattended notifications and/or one or more unattended/restless devices. In certain embodiments, the controller client 119 is implemented as a collection of one or more hardware, software, algorithms, firmware, or combinations thereof that may also be integrated for use with the service providers 105 and/or with the processing platform 107. In addition, the UEs 101 can execute an application 103 that is a software client for storing, processing, and/or forwarding one or more information items to other components of the system 100.

The UEs 101 may be any type of mobile terminal, fixed terminal, or portable terminal including a mobile handset, station, unit, device, healthcare diagnostic and testing devices, product testing devices, multimedia computer, glasses/goggles/visors including sensors, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the service providers 105 may include and/or have access to one or more database 115a-115n (also collectively referred to as database 115), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, location-based services, navigation services, social networking services (e.g., blogging), media upload, media download, media streaming, account management services, or a combination thereof. Further, the service providers 105 may conduct a search for content items, media items, information, coupons, and the like associated with one or more users, POIs, geo-locations, and the like.

In one embodiment, the processing platform 107 may include and/or have access to one or more database 117a-117n (also collectively referred to as database 117), which may include various user information, user profiles, user preferences, one or more profiles of one or more user devices (e.g., device configuration, sensors information, etc.), local access and network information, user location information, device location information, user and/or device network credentials, and the like. For example, the processing platform 107 may store content, various notification alert types, various electronic games and components, and the like, which may be provided by various users, various service providers, crowd-sourced content, and the like. In various embodiments, the content may be utilized, at least in part, in controlling one or more unattended notifications at one or more restless devices. Further, the processing platform 107 may sort, manage, store, and/or make the content available based on various parameters, for example, location information (e.g., of a submitter, of a requestor, etc.), sequential order, content type (e.g., audio, video, still images, etc.), date/time of a submission, date/time of a request, and the like.

In various embodiments, the processing platform 107 may facilitate creation of an ad hoc network for a neighborhood including one or more zones, one or more devices, one or more communities, one or more groups, etc. for controlling and/or coordinating control of one or more notifications on one or more devices, and the like. In various embodiments, the processing platform 107 may facilitate communications between the one or more devices including one or more queries, identify the one or more devices, determine location of the one or more devices, including one or more restless devices and one or more other devices, for sharing context information and messages, discovering devices, performing one or more processes, and the like. In one embodiment, the processing platform 107 may facilitate communications between one or more devices and the service providers 105. In one embodiment, the processing platform 107 may process and/or facilitate a processing of one or more communication messages, one or more control mechanism messages/commands, one or more requests, and the like for facilitating control of one or more notifications on one or more devices (e.g., a restless device).

By way of example, the UEs 101, the service providers 105 and the processing platform 107 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, and the processing platform 107 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
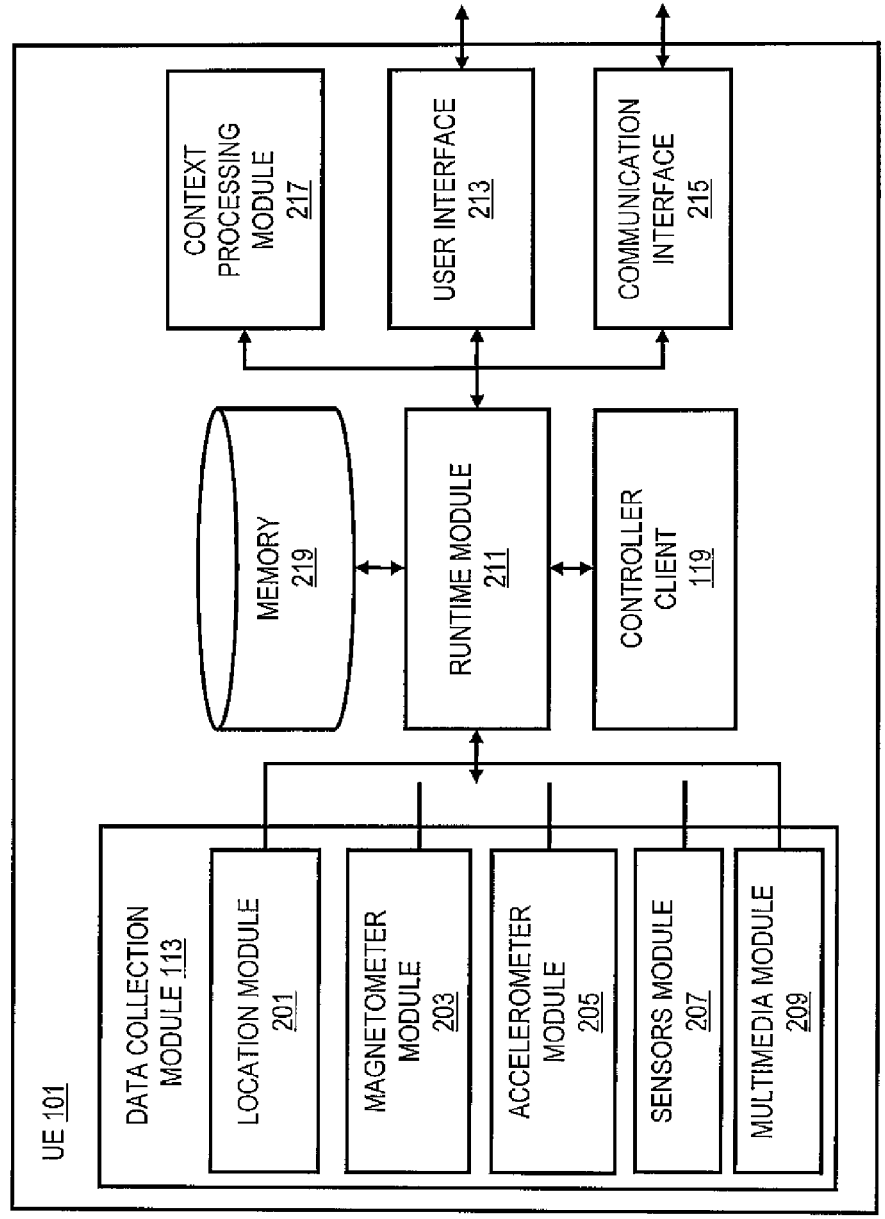
FIG. 2 is a diagram of the components of a user equipment capable of utilizing mechanisms to control unattended notifications at a device, according to an embodiment.

FIG. 2 is a diagram of the components of a user equipment capable of utilizing mechanisms to control unattended notifications at a device, according to an embodiment. By way of example, a UE 101 includes one or more components for controlling notifications at one or more devices. It is contemplated that the functions of these components may be combined in one or more components or performed by other components of equivalent functionality. In this embodiment, the UE 101 includes a data collection module 113 that may include one or more location modules 201, magnetometer modules 203, accelerometer modules 205, sensors modules 207, and multimedia modules 209. Further, the UE 101 may also include a runtime module 211 to coordinate the use of other components of the UE 101, the controller client 119, a user interface 213, a communication interface 215, a context processing module 217, and memory 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory 219 and are available to the context processing module 217, the data collection module 113, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 may be utilized for determining location of one or more UEs 101 in an indoor space, for example, by utilizing one or more signals from one or more UEs 101, one or more components of one or more local area networks, one or more indoor positioning systems, or a combination thereof.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, microphones, light sensors, etc.) to determine environmental (e.g., atmospheric) conditions surrounding the UE 101, user mood (e.g., hungry, angry, tired, etc.), location information, noise/sounds, lights, and various other information from a range sensors that may be available on one or more devices. For example, the sensors module 207 may detect conditions including humidity, temperature, geo-location, biometric data of the user, etc. Once again, this information can be stored in the memory 219 and sent to the context processing module 217 and/or to other entities of the system 100. In certain embodiments, information collected from the data collection module 113 can be retrieved by the runtime module 211 and stored in memory 219, made available to other modules and/or applications 103 of the UE 101, and/or sent to one or more entities of the system 100.

In one embodiment, the multimedia module 209 may be utilized to capture various media items, for example, images, video, audio, and the like, wherein the captured media may be submitted to one or more modules and applications of the UE 101, a service provider, and/or a content provider to further processing, storage, sharing, and the like. For example, a captured image of a nearby space (e.g., a nearby desk) may be submitted to the context processing module 217 for analysis and determining one or more information items (e.g., metadata), for example, geo-location information, textual information, user presence, device presence, and the like.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, a UE 101 can send context information associated with one or more notifications on the UE 101 to the service providers 105, the processing platform 107, one or more other UEs 101, and/or to other entities of the system 100.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the data collection module 113 and/or applications 103 executing on the runtime module 211. This information may be caused to be transmitted, via the communication interface 215, to the processing platform 107, to the service providers 105, and/or to other entities of the system 100. The context processing module 217 may additionally be utilized as a means for determining information related to the user, an instance of data, device status, one or more notifications, a value, a content item, an object, a subject, and the like. In certain embodiments, the context processing module 217 can infer higher level context information from the context data such as a notification type, a notification source, favorite locations, significant places, common activities, interests in products and services, POIs at various geo-locations, etc.

Figure 3:
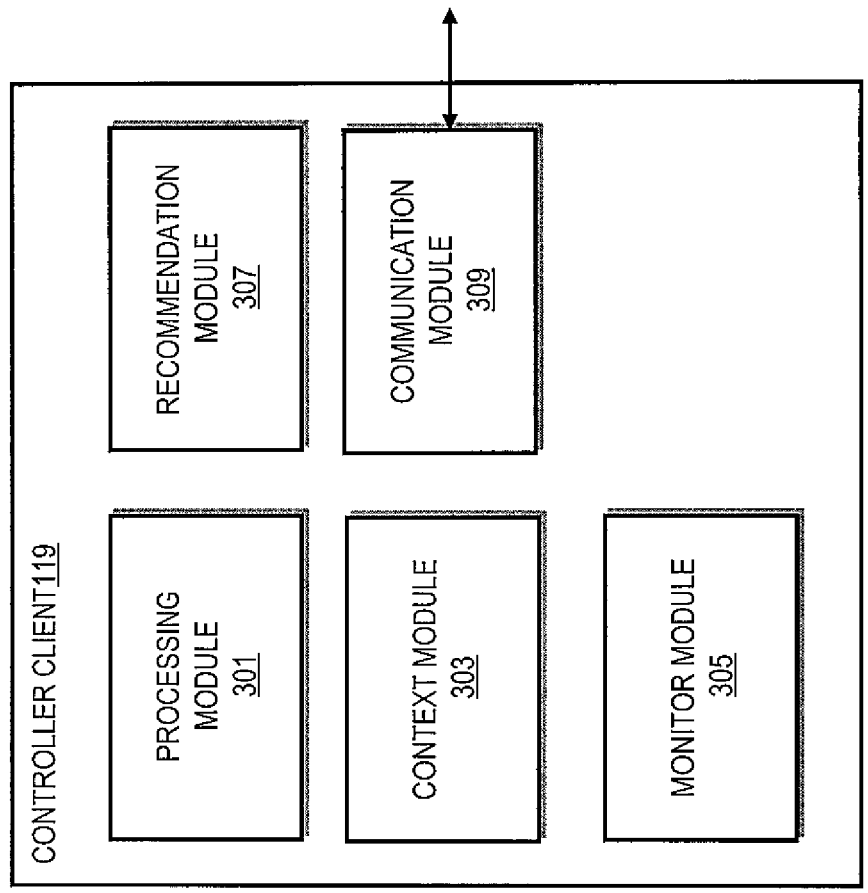
FIG. 3 is a diagram of components of a controller client for controlling unattended notifications at a device, according to an embodiment.

FIG. 3 is a diagram of components of a controller client 119, according to an embodiment. By way of example, the controller client 119 includes one or more components for providing mechanisms to control unattended notifications at a device. As discussed above, it is contemplated that the functions of these components may be combined in one or more components or performed by other components of equivalent functionality. In this example embodiment, the controller client 119 includes a processing module 301, a context module 303, a monitor module 305, a recommendation module 307, and a communication module 309.

The processing module 301 enables the controller client 119 to process contextual information of one or more notifications at one or more devices to determine ringtone/alert events and assigns identification (ID) information to each of the event alerts. Further, the processing module 301 based, at least in part, on the ID information may determine whether one or more notification alerts at a device may identify the device as a restless device, wherein one or more notifications may be causing a disturbance/annoyance in a neighborhood close to the device (e.g., restless device). In one embodiment, a first processing module 301 may determine that a first device is a restless device, by utilizing one or more parameters for the determination.

The context module 303 enables the controller client 119 to determine contextual information associated with a device and neighboring devices by collecting or determining contextual information associated with the device and the neighboring devices. In one embodiment, the context module 303 may determine contextual information from a user profile, a device profile, device configuration, the applications 103, the data collection module 113, the processing platform 107, and/or the service providers 105. The contextual information provided to the controller client 119 may include, for example, notification type at a device, user profile information, user preference information, temporal information, location information, activity information, or a combination. For example, multiple notifications at a device "A" may be unattended, where a user "A" may or may not be available, when the context module 303 in collaboration with the processing module 301 may utilize various parameters associated with the device and/or user "A," for instance, one or more preferences, configurations, history, notification source, notification duration, notification type, lapsed time since last notification, whether one or more other devices are nearby, device "A" status, user "A" presence, and the like.

The monitor module 305 may monitor one or more notification profiles at the one or more devices for any updates from one or more other devices, the processing platform 107, the service providers 105, and/or one or more elements of the system 100. In one embodiment, each time a UE 101 receives a notification alert modification request, a query message, an updated notification alert type, the monitor module 305 may compare the contextual information and update the contextual information at the UE 101, wherein the monitoring may be based, at least in part, on a UE 101 determined to be a restless device, one or more unattended notifications, and the like. The monitor module 305 may cause, at least in part, an updating of one or more lists of neighboring devices and/or participating devices, the at least one notification alert type, or a combination thereof based, at least in part, on the monitoring. When the contextual information changes, as determined based on the monitoring, the monitor module 305 may update any or all of the lists and provided notification alert types based on the changes. In one embodiment, the changes in the contextual information that result in an update of the lists and/or notification alert types may occur if the changes satisfy one or more thresholds. For example, the thresholds may be based, at least in part, on a time difference between an initial notification alert time $T_1$ and a subsequent notification alert time $T_2$.

The recommendation module 307 recommends one or more notification alerts based, at least in part, on one or more user preferences (e.g., neighboring users), preferences of a user of a restless device, the restless device capabilities, neighborhood configurations (e.g., office, home, library, etc.), time of day, and the like. In various embodiments, the recommendation module 307 recommends, according to rankings of the neighboring devices based on their physical and/or social proximity, selection of available notification alerts (e.g., ringtones, musical clips, etc.) based on determined popularity information among the neighboring devices/users, conformance with the neighborhood requirements (e.g., too loud, too low, no audio, etc.), and the like.

The communication module 309 may communicate notification control messages, query messages, updated notification alert type messages, acknowledge messages, and the like among one or more restless devices, one or more other devices, the processing platform 107, the service providers 105, and the like. In various embodiments, the communications may be effectuated via one or more local, P2P, and/or network channels, for example, via Bluetooth®, WLAN, Wi-Fi Direct, an ad-hoc network, IR, and the like. In one embodiment, a multi-hop communication mode/topology may be utilized where the communication module 309 relays one or more messages to one or more neighboring devices before reaching a further distant neighboring device.

Figure 4:
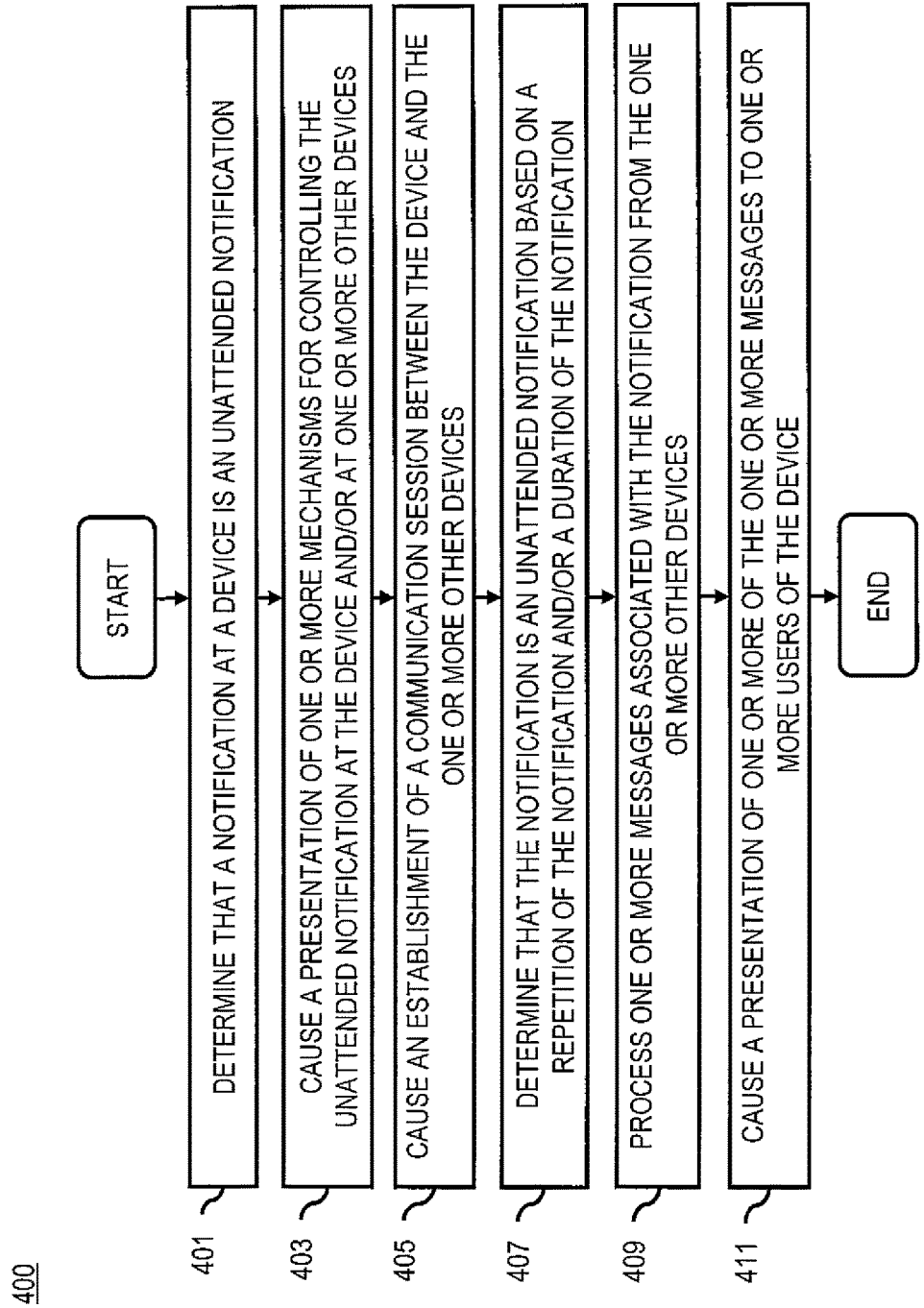
FIGS. 4-6 are flowcharts of a process for determining and controlling unattended notifications at a device, according to various embodiments.
Figure 12:
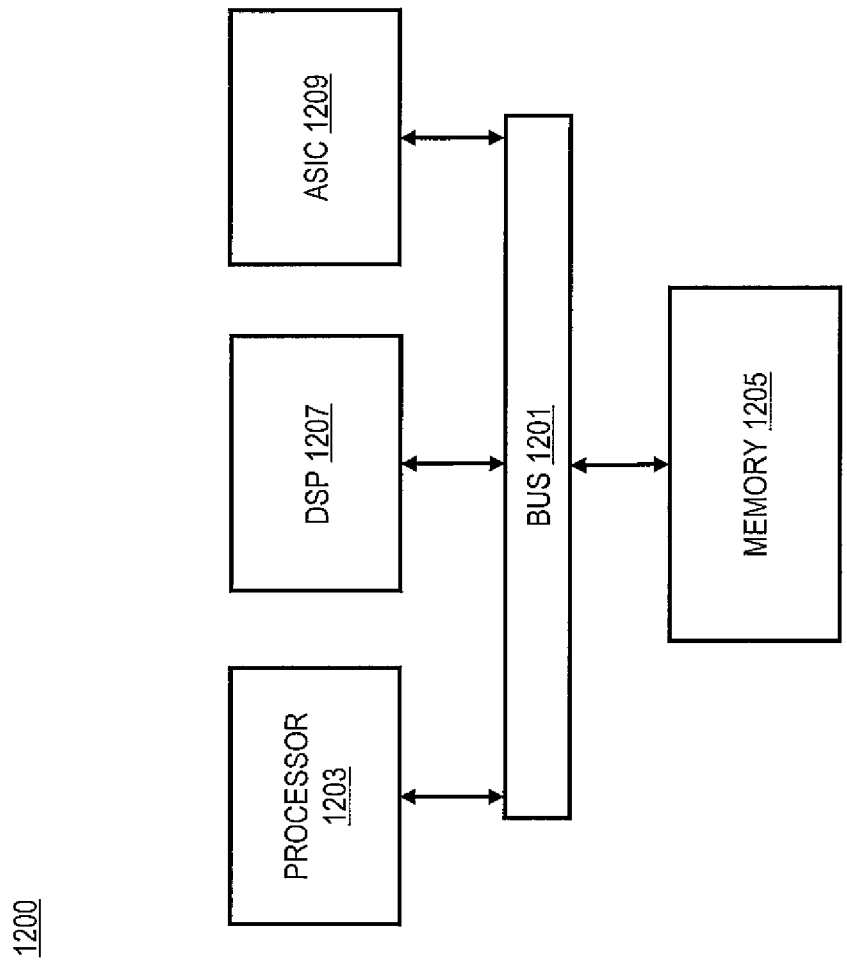
FIG. 12 is a diagram of a chip set that can be used to implement an embodiment of the invention.

FIG. 4 is a flowchart of a process for, at least, determining unattended notifications and presenting controlling mechanism at a device, according to various embodiments. In various embodiments, the controller client 119 may perform the process 400 and may be implemented in, for instance, a chip set including a processor and a memory as shown in FIG. 12. Further, the controller client 119, the service providers 105, the processing platform 107, and/or the UEs 101 can provide means for accomplishing various parts of the process 400 as well as means for accomplishing other processes in conjunction with other components of the system 100. Throughout this process, the controller client 119 is referred to as completing various portions of the process 400, however, it is understood that other components of the system 100 can perform some of and/or all of the process steps. Further, in various embodiments, the controller client 119 may be implemented in one or more entities of the system 100.

In step 401, the controller client 119 determines that at least one notification presented at a device is an unattended notification. In one embodiment, one or more notifications may be triggered at a device where the notifications may be caused, for example, by one or more incoming communication requests, one or more applications (e.g., calendar, clock, games, etc.), one or more service providers, and the like. Further, one or more applications and/or modules at the device, at one or more other devices, at a service provider, and the like may determine that the one or more notifications on the device are unattended, for example, a user of the device is not responding to the one or more notifications (e.g., user is busy, user is absent, etc.) Furthermore, the one or more applications and/or modules may utilize one or more parameters and methods to determine that the device presenting the one or more unattended notifications is a restless device. In one embodiment, the one or more parameters may indicate that within a system-defined time period, ($T_a$), one or more notifications triggered by one or more sources (e.g., a caller, an application, etc.) have been unanswered/unattended for at least a total time length of ($T_r$), where ($T_r$<$T_a$), for example, aggregated notification time from the one or more sources has lasted for ($T_r$) within ($T_a$) when the one or more notifications have remained unattended/unanswered. In various embodiments, values for ($T_r$) and/or ($T_a$) may be set according to the one or more sources, one or more notification types, device type, user preferences, and the like. In one embodiment, values of ($T_r$) and/or ($T_a$) may be static and/or may be manually defined by one or more users. In one embodiment, the values may be dynamically defined based, at least in part, on a particular source of one or more notifications, for example, a caller's or a caller-group's context data which may include historical "restless behaviors", user and/or device profiles, social relationships with a user of the restless device, current location information of the restless device, and the like. For example, it may take a longer time for a device to become restless if a source of one or more unattended notifications is a previously less restless source (e.g., friend). In one embodiment, a ratio $\tau=(T_r)/(T_a)$ which may be increased by increasing ($T_r$) while ($T_a$) is substantially constant, or by decreasing ($T_a$) while ($T_r$) is substantially constant, wherein this may result for a device and/or a source of the one or more notifications to take longer or shorter time before determined as restless.

In step 403, the controller client 119 causes, at least in part, a presentation of one or more mechanisms for controlling the unattended notification at the device, at one or more other devices, or a combination thereof. In various embodiments, one or more restless devices, one or more other devices, and/or a service provider may cause presentation of the one or more mechanisms at the one or more restless devices and/or at the one or more devices whereby a user and/or one or more devices may control the one or more unattended notifications at the restless device. In one embodiment, a UI may be presented as a component of a control mechanism at a restless device whereby a user may interact with the device to control a notification, for example, turn-off the notification, change the notification type (e.g., effect, volume, etc.), forward the notification to another device (e.g., from a mobile phone to a tablet) for a user of the restless device, one or more other users, and the like. In one embodiment, one or more control mechanisms may be presented at one or more other devices whereby one or more users may utilize the one or more other devices for controlling one or more notifications and/or one or more restless devices. For example, a device "A" is restless and a mechanism for controlling the device "A" is presented at a device "B" where a user of device "B" (e.g., via UI elements) and/or one or more applications at the device "B" may utilize the mechanism to send one or more controlling messages, for example, directly to the device "A," via one or more other devices, and/or via one or more service providers. In one embodiment, a restless device may utilize one or more mechanism to substantially control the unattended notifications at the restless device without assistance from a service provider, other devices, and/or users. In one embodiment, one or more neighboring devices may ignore a nearby restless device, wherein the restless device may or may not utilize the one or more mechanism for controlling one or more unattended notifications. In one embodiment, the one or more mechanisms may be utilized to provide for one or more hybrid control mechanisms whereby a restless device may substantially simultaneously be controlled via the restless device (e.g., a UI) and via one or more other devices.

In step 405, the controller client 119 causes, at least in part, an establishment of at least one communication session between the device and the one or more other devices, wherein the one or more mechanisms operate, at least in part, over the at least one communication session. In one embodiment, the at least one communication session is a P2P communication session via, for example, Bluetooth®, Wi-Fi direct, infrared (IR), wireless local area network (WLAN), and/or other short range communication methods. In one embodiment, one or more devices in a close proximity (e.g., a neighborhood) may utilize one or more mechanism to determine presence of one or more other devices in close proximity, wherein a list of present devices may be stored, updated, utilized, and the like via one or more devices and/or one or more service providers (e.g., cloud services).

In step 407, the controller client 119 determines that the at least one notification is an unattended notification based, at least in part, on a repetition of the at least one notification, a duration of the at least one notification, or a combination thereof. In one embodiment, one or more applications and/or one or more modules at one or more devices, and/or one or more service providers may utilize one or more sensors to determine one or more notifications, for example, aural, visual, vibration, and the like at a device, wherein the one or more notifications may be determined to be unattended if the one or more notifications persist and/or repeat over a predetermined time period. In various embodiments, the predetermined time period may be based, at least in part, on one or more user preferences, use history, neighborhood information, device capabilities, service provider configurations, notification frequency, notification type, and the like. In one embodiment, one or more notifications (e.g., phone calls, IM, SMS, alerts, etc.), may be caused and repeated by one source/application/module where the one or more notifications may be of one or more types (e.g., audio, visual, vibrate, etc.). For example, there are five unattended notifications from a same party due to five communication attempts, for instance, three incoming phone calls, one IM session, and one SMS message, where the five unattended notifications may repeat over a certain time period.

In step 409, the controller client 119 processes and/or facilitates a processing of one or more messages associated with the at least one notification from the one or more other devices. In one embodiment, one or more other devices and/or other users may generate/create one or more messages in response to one or more notifications observed at a device. For example, the one or more messages may include information related to the one or more notifications observed at the device, for instance, a type of notification, duration of notification, notification source, like/dislike messages from the one or more other users related to the one or more notifications and/or the device, and the like.

In step 411, the controller client 119 causes, at least in part, a presentation of one or more of the one or more messages to one or more users of the device based, at least in part, on the repetition of the at least one notification, the duration of the at least one notification, or a combination thereof. In one embodiment, the one or more messages may be presented to one or more users of the device which is producing the one or more notifications. For example, the one or more messages may be presented (e.g., email, SMS, IM, etc.) to a user of the device via another device associated with the user, via a service provider (e.g., a social networking service), and the like to remind/indicate to the user that the user's device has become restless and is disturbing other neighboring users/devices.

Figure 5:
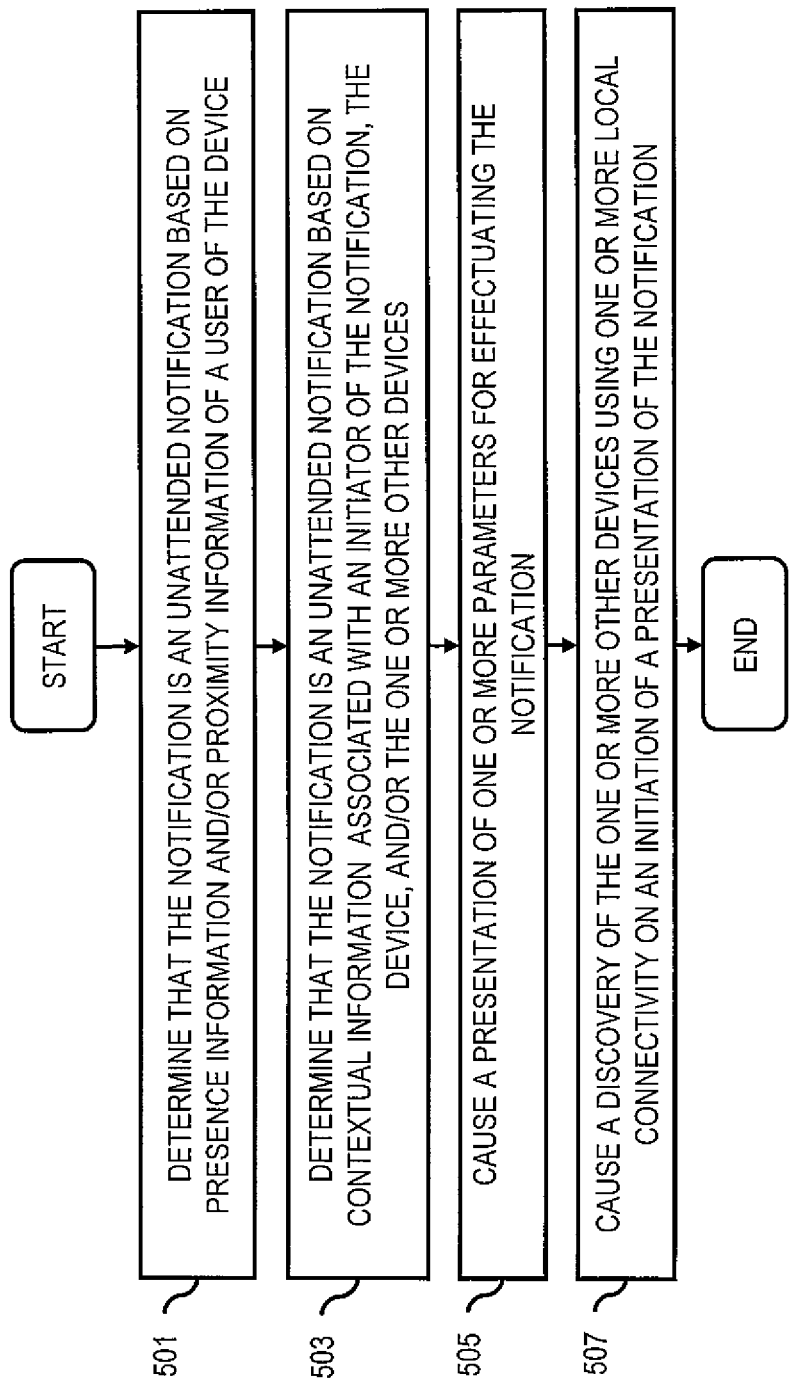

FIG. 5 is a flowchart of a process for, at least, determining unattended notifications at a device and presence of a user, according to various embodiments. In various embodiments, the controller client 119 may perform the process 500 and may be implemented in, for instance, a chip set including a processor and a memory as shown in FIG. 12. Further, the controller client 119, the service providers 105, the processing platform 107, and/or the UEs 101 can provide means for accomplishing various parts of the process 500 as well as means for accomplishing other processes in conjunction with other components of the system 100. Throughout this process, the controller client 119 is referred to as completing various portions of the process 500, however, it is understood that other components of the system 100 can perform some of and/or all of the process steps. Further, in various embodiments, the controller client 119 may be implemented in one or more entities of the system 100.

In step 501, the controller client 119 determines that the at least one notification is an unattended notification based, at least in part, on presence information, proximity information, or a combination thereof of one or more users associated with the device. In one embodiment, location information of a user in relation to a device of the user is utilized to determine whether one or more notifications at the device are unattended. For example, a user may be away from his device, or may be nearby, may be next to the device, etc. In various embodiments, one or more parameters, user preferences, neighborhood and/or service provider configurations, and the like may utilize the location information to indicate that one or more notifications at the device are unattended. For example, if a user is at a certain distance from the device, a notification may be determined unattended. In various embodiments, one or more information items from one or more sensors, for example, GPS, radar, surveillance cameras, facial recognition, microphone, user bodily worn devices (e.g., a headset), and the like may be utilized to determine proximity and/or presence of a user and an associated device.

In step 503, the controller client 119 determines that the at least one notification is an unattended notification based, at least in part, on contextual information associated with an initiator of the at least one notification, the device, the one or more other devices, or a combination thereof. In various embodiments, one or more information items related to one or more sources/initiators of one or more notifications at a device are determined and utilized for, at least in part, determining if the one or more notifications at a device are unattended. For example, if the source/initiator of a notification is determined to be an important person (e.g., spouse, supervisor, etc.) and/or event associated with user of the device, then the notification maybe will not be identified as unattended. In one example, if a device which is producing a notification is associated with a certain user (e.g., spouse, supervisor, etc.), then may be the notification will not to be determined as unattended. In one example, if a device producing a notification is in close proximity to a certain device (e.g., a supervisor's device), then the notification may be quickly determined as unattended. In various use scenarios, the contextual information may be utilized by a first user to specify/cause one or more actions; for instance, a) change the notification mode to vibration if the restless device is the first user's child's phone, b) send to a user of a restless device an email if the restless device is the first user's colleague's phone, c) change a notification ringtone to a musical tone if the restless device has rarely been identified as a restless device, otherwise submit a dislike vote to a service provider and/or a user of the restless device, d) mute a notification alert call if the first user is in a meeting and the user of the restless device is also in the same meeting (e.g., according to a calendar entry on the restless device), e) mute a notification alert if the first user is in a reading room and the restless device is also in the same room (e.g., according to location information), f) turn down the notification alert volume to a certain level (e.g., 20% of the full volume) if distance between the restless device and a first user/user device is, for example, less than 10 feet, or to 30% if the distance is between 10 and to 15 feet, or otherwise to 50%. In one example, 10 seconds after a dislike vote, if an unattended notification continues, change the notification mode to vibration, and after 10 more seconds if the vibration still continues, change the notification mode to on-screen flashing without audio or vibration.

In various embodiments, one or more parameters, for example ($T_r$) and/or ($T_a$), may be utilized to configure one or more conditions, at least in part, for a device to become a restless device. For example, one or more configurations may provide for a longer time before the spouse or the supervisor to cause a device to become restless when compared to friend. In one example, it may take a longer time before a colleague may cause a device to become restless, if he makes one or more phone calls from a work place when compared to his place of residence. In one example, it may take a shorter time before a colleague may cause a device to become restless, if he makes one or more phone calls from a same location as one or more phone calls made by another common colleague within a certain time period. In one embodiment, the time for a device to be determined as a restless device may, at least in part, depend on a notification type setting; for example, a longer time if a current notification type is set as ringing at a volume of 50% of the full volume, or even a longer time if the ringing volume is set 30%, or a substantially longer time if the setting is such that it does not ring and only vibrates, or the device may never be determined to be restless if the ringing setting is at "mute" without vibration (e.g., in a silent mode.)

In use case scenario, a restless device may have a multiple of neighboring devices, for example three, where users of the multiple devices may have indicated via one or more parameters (e.g., configurations, messages, etc.) that they may tolerate a ringing notification at a nearby devices for 20, 30, and 60 seconds. Further, the parameters may be aggregated by the restless device, for example via an ad-hoc P2P transmission, and/or a service provider where the value of ($T_r$) may be set an aggregated value of the neighbor tolerance limits (e.g. average of 37 seconds, minimum of 20 seconds, median of 30 seconds, etc.) In one embodiment, one or more users may specify one or more configuration limits (e.g., ringing duration, ringing volume, etc.) for nearby restless devices, wherein the configuration limits may be stored, maintained, and/or utilized by a service client. In one embodiment, spatial size of a neighborhood, one or more zones in the neighborhood, the number of other devices/users in the neighborhood, and the like may be utilized, at least in part, in determining when a device may be identified as a restless device. For example, it may take a shorter time for a device to be identified as a restless device if the neighborhood includes a larger spatial area with a large number of other devices.

In step 505, the controller client 119 causes, at least in part, a presentation of one or more parameters for effectuating the at least one notification based, at least in part, on the at least one notification, one or more capabilities of the device, one or more user profiles at the devices, one or more user profiles at the one or more other devices, one or more social connectivity among the device and the one or more other devices, or a combination thereof. For example, the one or more notifications at a device (e.g., a restless device) may be modified by one or more users, one or more other devices, one or more service providers, and the like based on one or more capabilities of the device to produce one or more types of notifications, for instance, musical tones, vibration, flashing lights, higher/lower audio volume, ringing tones, and the like. In one embodiment, the one or more notifications may be modified based on a user profile, preferences, and/or configurations at the device. In one embodiment, the notifications may be modified based on a social connectivity/relationship among the device/user and one or more other users/devices. For example, the devices are in an office area, the users are employees of a same employer, the users are members of a same family, and the like. In one embodiment, the one or more parameters may include one or more gaming elements, one or more social networking elements, one or more entertainment elements, one or more informative elements, and the like. In one embodiment, one or more modifications to one or more unattended notifications at a restless device may be for a limited time based, at least in part, one or more configurations at the restless device, at the one or more other devices, at a service provider, and the like. In one embodiment, a restless device may utilize one or more prior control mechanisms and/or settings to control one or more current and/or future notifications.

In step 507, the controller client 119 causes, at least in part, a discovery of the one or more other devices using one or more local connectivity on an initiation of a presentation of the at least one notification. In one embodiment, one or more devices and/or service providers may utilize one or more short range and/or local connectivity (e.g., to a local server) services to discover one or more other devices in close proximity, wherein the discovery may be based, at least in part, on one or more notifications (e.g., ringing, vibrating, flashing light, etc.) triggered at a device. In one embodiment, the discovery is based, at least in part, on one or more probe messages exchanged between the device and the one or more other devices. In one example, the device producing a notification may cause, at least in part, a probing message for discovery of the one or more other devices. In one example, the one or more other devices may utilize one or more sensor information to detect a notification at the device and cause, at least in part, one or more probing messages for discovering the device producing the notification. In one embodiment, the discovery is based, at least in part, on location information associated with the device and the one or more other devices. In one embodiment, a device and one or more other devices may be located in a neighborhood, in one or more zones within the neighborhood, and the like. In one embodiment, the discovery is based, at least in part, one or more audio signals broadcast among the device and the one or more other devices. For example, the device and/or the one or more other devices may provide and/or detect one or more audio signals produced based, at least in part, on one or more notifications at the device, at the one or more other devices, and the like. In one embodiment, the one or more audio signals include, at least in part, one or more inaudible audio signals. For example, the one or more audio signals may include one or more components that may be inaudible by users (e.g., outside of user hearing range, frequency, level, etc.), which may still be detected by the device and/or the one or more other devices. In one embodiment, the inaudible audio signals may be produced by one or more devices while in a silent mode.

Figure 6:
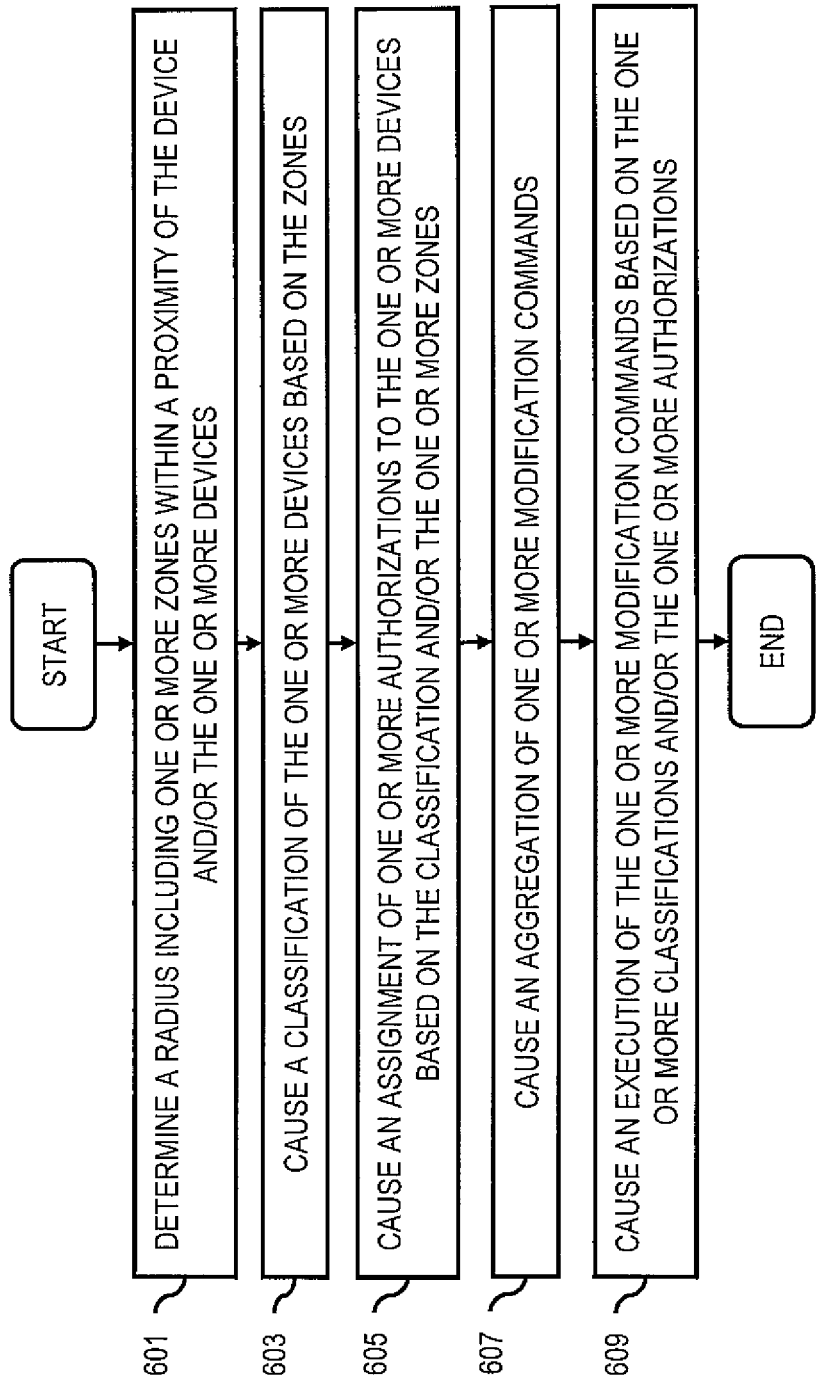

FIG. 6 is a flowchart of a process for, at least, determining a neighborhood and zones associated with unattended notifications at a device, according to various embodiments. In various embodiments, the controller client 119 may perform the process 600 and may be implemented in, for instance, a chip set including a processor and a memory as shown in FIG. 12. Further, the controller client 119, the service providers 105, the processing platform 107, and/or the UEs 101 can provide means for accomplishing various parts of the process 600 as well as means for accomplishing other processes in conjunction with other components of the system 100. Throughout this process, the controller client 119 is referred to as completing various portions of the process 600, however, it is understood that other components of the system 100 can perform some of and/or all of the process steps. Further, in various embodiments, the controller client 119 may be implemented in one or more entities of the system 100.

In step 601, the controller client 119 determines a radius including one or more zones within a proximity of the device, the one or more devices, or a combination thereof. In one embodiment, a device, one or more other device, a service provider, one or more users, and the like may determine a space between the device and the one or more other devices, wherein the space may include one or more zones. For example, an office area may include several devices of which a first device may be producing one or more notifications. Further, one or more zones may be determined in relation to the device and the one or more other devices within the office area. In one example, the space may include other devices that may at an audio range, but not at a visual range and/or line of sight.

In step 603, the controller client 119 causes, at least in part, a classification of the one or more devices based, at least in part, on the one or more zones. In one embodiment, the one or more zones may include one or more devices/ users, wherein the one or more devices/users may be classified (e.g., prioritized) based, at least in part, on the zone wherein the one or more devices/users are located in. For example, a first device may be in a zone which is right next to a restless device producing a notification, where the first device may be classified as being at a close proximity (e.g., zone-1).

In step 605, the controller client 119 causes, at least in part, an assignment of one or more authorizations to the one or more devices based, at least in part, on the classification, the one or more zones, or a combination thereof. In one embodiment, the one or more other devices may be assigned one or more authorizations for controlling one or more notifications at a device based, at least in part, on a classification and/or a zone associated with the one or more devices. For example, a zone next to a restless device zone may be assigned a high priority zone and a device within the high priority zone may be assigned a higher level of authorization for controlling one or more notifications at the restless device.

In step 607, the controller client 119 causes, at least in part, an aggregation of one or more modification commands. In one embodiment, one or more modification commands from one or more devices, one or more service providers, and the like may be aggregated, for example, by the one or more devices, the one or more service providers, and the like, wherein the one or more modification commands may include one or more parameters, one or more configurations, one or more preferences, one or more settings, and the like. In one embodiment, the one or more modification commands may be utilized, at least in part, for modifying and/or controlling one or more notifications at one or more devices. For example, a modification command may request that a notification alert type be changed from an audio alert to a vibration alert, or from a change the audio alert level to a certain level, or stop a flashing-light alert, and the like. In various embodiments, multiple devices in an ad-hoc neighborhood may view and attempt to control a restless device, wherein one or more control messages/commands from the multiple devices may cause one or more conflicts where the restless device and/or an aggregation point (e.g., a service provider, a server, etc.) may select/execute a "first-arrived" control message, or after the first control message is received, the restless device may wait for a system-defined time period ($T_d$) to determine if there may be other potential subsequent control messages. Further, after the ($T_d$), the restless device may broadcast a restless termination message to the one or more other devices (e.g., neighboring devices). In one embodiment, one or more portions of one or more control messages/commands/configurations may be utilized to determine one or more parameters for modifying one or more notifications at a restless device.

In step 609, the controller client 119 causes, at least in part, an execution of the one or more modification commands based, at least in part, on the one or more classifications, the one or more authorizations, or a combination thereof. In one embodiment, a device producing one or more notification alerts may execute one or more medication commands for modifying the one or more notification alerts based, at least in part, one or more classifications associated with the one or more modification commands and/or one or sources of the one or more modification commands For example, a classification may be associated with a certain device which is in a certain zone and/or at a certain proximity with reference to a restless device, or the classification may be associated with a user of a device providing a modification command, or the classification may be associated with a service provider, and the like. In one embodiment, a modification command may be associated with an authorization, which may be associated with one or more devices, one or more users, one or more service providers, and the like. In one embodiment, the execution of the one or more modification commands is based, at least in part, on a ranking, a rating, a voting, or a combination thereof associated with the one or more modification commands In various embodiments, the one or more modification requests may be associated with one or more rankings, ratings, votings, and the like, which may be determined based, at least in part, one or more information items by one or more users, one or more devices, one or more service providers, and the like. For example, a user may vote to modify a notification alert on a device (e.g., a restless device) to a different type of notification, or may rank one or more notifications (e.g., currently in use, proposed, suggested, etc.), or may rate the one or more modifications, and the like. In one embodiment, the execution of the one or more modification commands is based, at least in part, on one or more thresholds at the device, at the one or more other devices, or a combination thereof. In one embodiment, the one or more thresholds may include one or more parameters associated with the one or more notifications types (e.g., audio, vibrate, flashing lights, etc.), intensity level (e.g., level of audio, vibration, flashing light, etc.), frequency (e.g., how many times in a certain time period), source (e.g., person, application, etc.), duration (e.g., how long), and the like. In one embodiment, the one or more thresholds may be defined by one or more users, one or more devices, one or more service providers, one or more applications, and the like.

Figure 7:
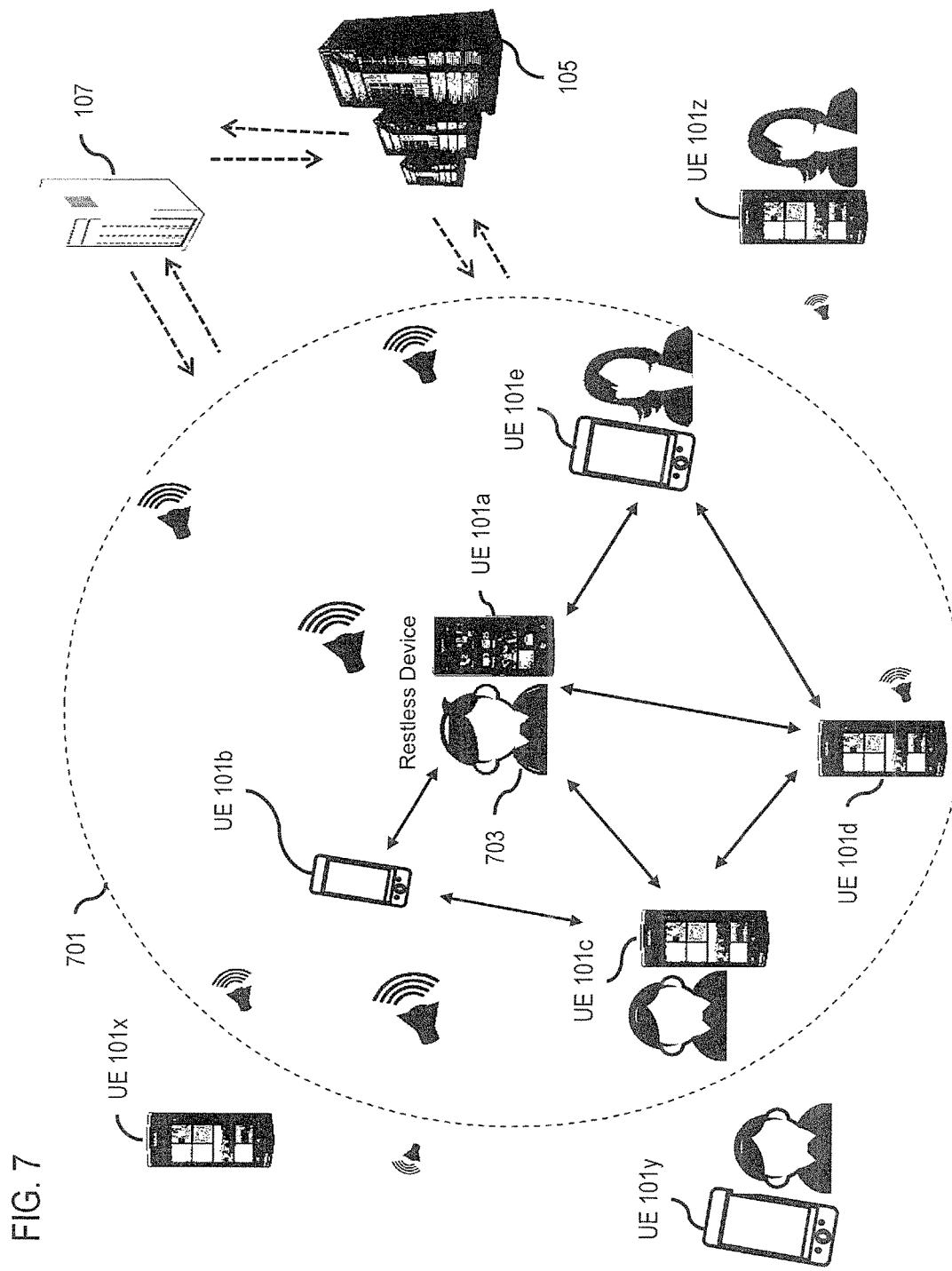
FIG. 7 is a system diagram of capable of utilizing the processes of FIGS. 4-6, according to an embodiments.

FIG. 7 is a system diagram of capable of utilizing the processes of FIGS. 4-6, according to an embodiment. Illustrated in a spatial area/neighborhood 701 are a restless device UE 101a and its user 703, and neighboring devices UEs 101b-101e, wherein each UE 101 may execute one or more controller client 119. It is noted that the user 703 may or may not be present (e.g., near the UE 101a) and when present, it is possible that one or more notifications at the UE 101a may be unattended (e.g., the user is busy with other tasks, cannot hear/see a notification, etc.) In one embodiment, the neighborhood 701 may include one or more zones, which may be determined by the UEs 101, a processing platform, a service provider, and the like. Further, depicted are UEs 101x, 101y, and 101z which are shown outside of the neighborhood 701. Furthermore, depicted are service providers 105 and processing platform 107, which may communicate with each other and/or with one or more of the UEs 101a-101z. In one embodiment, the UEs 101a-101e utilize one or more P2P communication channels to discover and/or communicate with one or more other UEs 101 to exchange one or more messages, information items, data, broadcasts, notifications, and the like. For example, the communications may include one or more restless broadcast messages, control messages, on/off notifications, acknowledgments, neighbor control termination messages, restless termination messages, context data, and the like. Further, as shown, a user may or may not be near any of the UEs 101, wherein the UEs 101 may execute the processes of the system 100 for controlling one or more unattended notifications at one or more restless devices. Furthermore, the processing platform 107 may facilitate one or more processes of the system 100 for providing the one or more mechanisms for controlling one or more unattended notifications at one or more restless devices and/or may communicate with the service providers 105 for completing one or more processes of the system 100. In various embodiments, the service providers 105 and/or the processing platform 107 may include and/or utilize one or more component, for example, a ringtone database, a restless history database, a context database, a positioning and mapping service, a recommendation engine, and the like. In one embodiment, the UEs 101x, 101y, and 101z may enter the neighborhood and join the one or more UEs therein.

Figure 8:
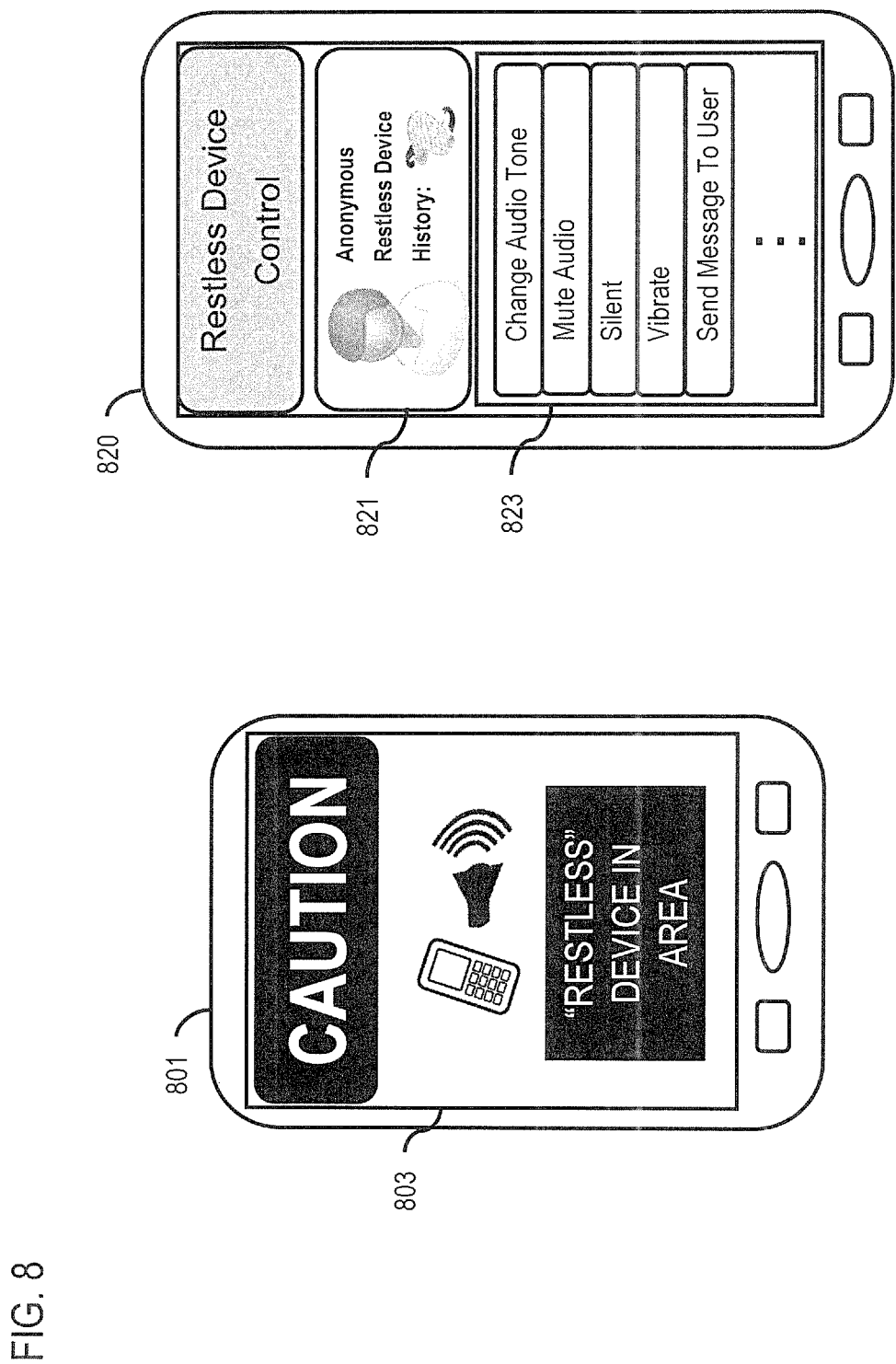
FIGS. 8-10 are user interfaces utilized in the processes of FIGS. 4-6, according to various embodiments.
Figure 9:
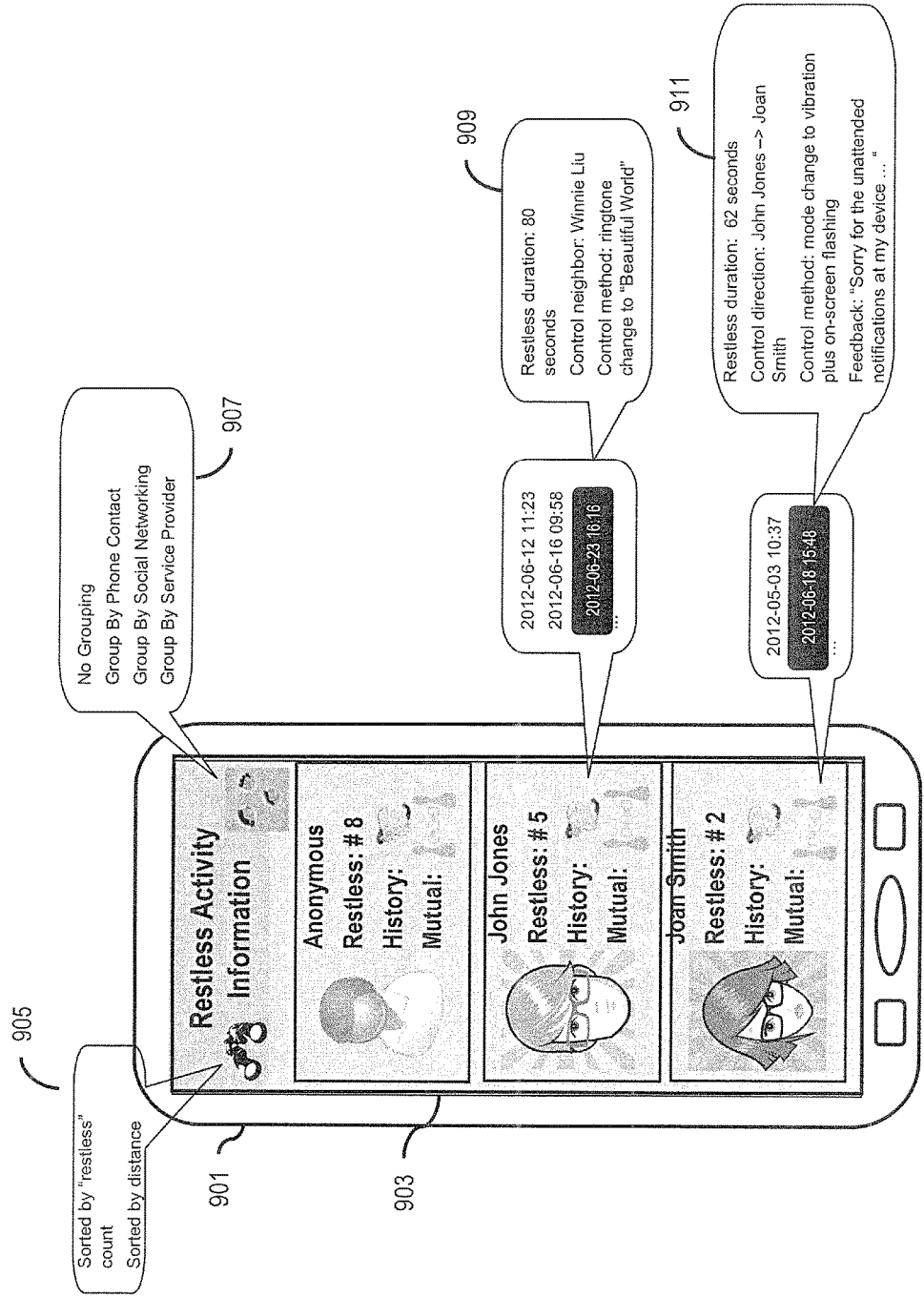
Figure 10:
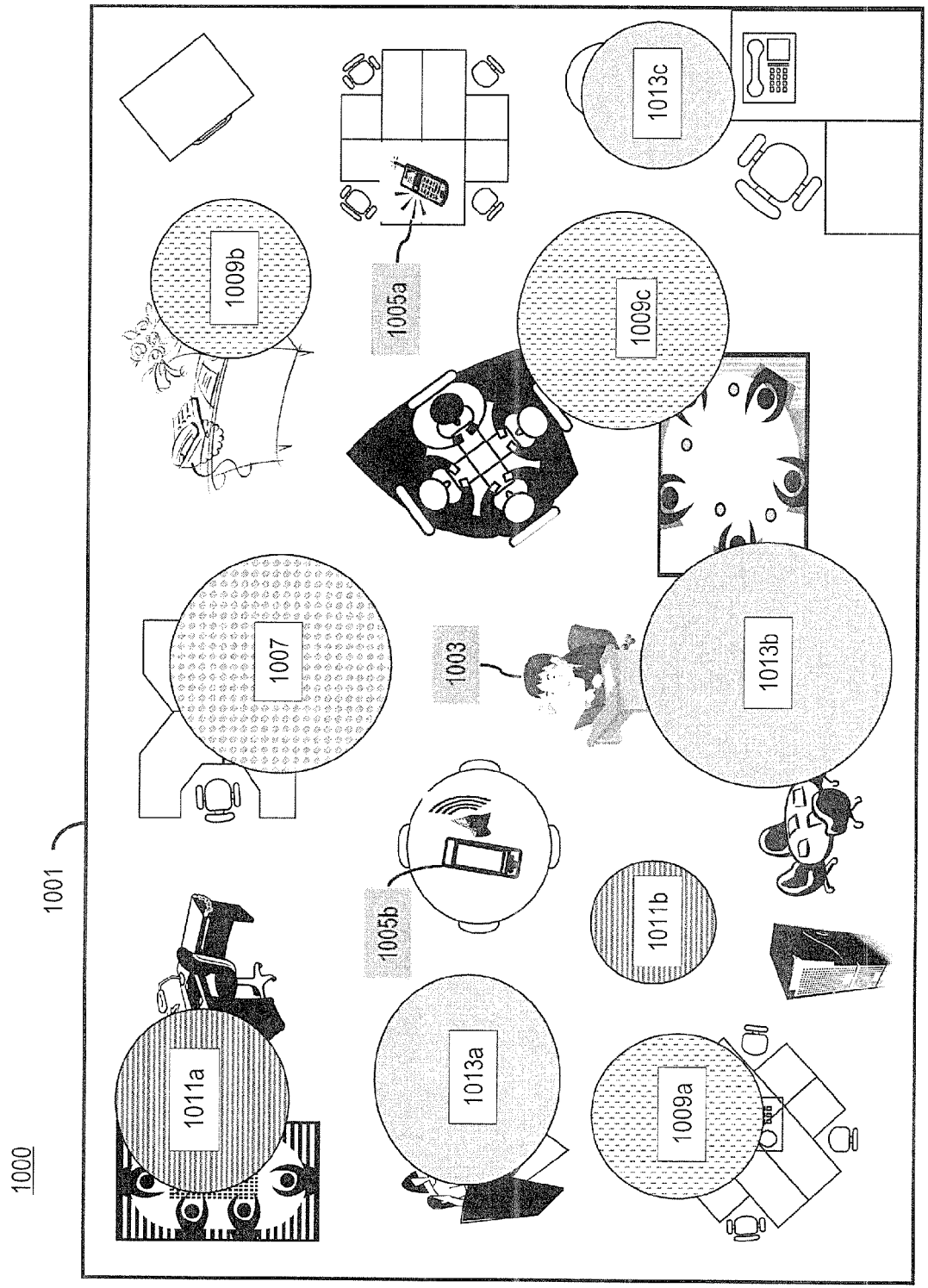

FIGS. 8-10 are user interfaces utilized in the processes of FIGS. 4-6, according to various embodiments.

In FIG. 8, UI 801 presents at one or more devices information related to one or more restless devices within a spatial space. For example, the UI 801 may include information panel 803 wherein one or more information items may be presented, for instance, presenting a cautionary message to indicate that there is a restless device in the area (e.g., in close proximity), to show a device type, and/or other related information. Further, UI 820 presents information 821 and options 823 for controlling one or more restless activities. In various embodiments, the UI 820 may be presented at a restless device and/or at one or more other devices. For example, the UI 820 may be presented at a restless device so that one or more users may interact with the restless device to affect one or more changes to one or more notification alerts/methods at the restless device. In one embodiment, the UI 820 may be presented at one or more other devices so that one or more users may cause one or more changes to the one or more notifications at the restless device. In one embodiment, the information 821 may include one or more information items associated with a restless device, a user of the restless device, history associated with the restless device, its user, and/or one or more other users/devices in close proximity (e.g., in the neighborhood.) In one embodiment, the options 823 may include one or more actions/choices for affecting one or more changes at a restless device. For example, one or more users and/or applications at a restless device and/or at one or more other devices may select from a range of options to cause a change/action at the restless device, for example, to change an audio tone, mute audio, silence audio, vibrate mode, send a message to a user of the restless device, and the like.

FIG. 9 illustrates UI 901 wherein one or more information items 903 related to restless activity information on one or more UEs 101 and/or one or more users are listed. In one embodiment, the information items may be listed/sorted according to one or more options 905, one or more groupings 907, or a combination thereof. In one embodiment, the information items include data related to a restless device and/or a user of the restless device, for example, identify of the restless device/user, however, identify of the device/user may remain anonymous. Further, the information items may indicate a ranking for the restless device/user, for example, in the neighborhood, within a certain time period, all-time record, and the like. In one embodiment, the information may indicate a history 909 of restless activities including unattended notification information, a controlling device/user, control mechanism, modifications made to the notification/device configuration, and the like. In one embodiment, the information list may include indicator 911 for showing/indicating possible control information and/or messages sent to a user of a restless device and possible information and/or messages returned by the user of the restless device. For example, the message to user of the restless device may indicate control time, control mechanism, controlling device/user, modification to the restless device, and the like, as well as acknowledgement, information, and/or messages returned by the user of the restless device, for instance, to apologize, indicate when the user will be able to attend to the restless device, thank the controlling device/user, provide further feedback, and the like. In one embodiment, the UI 901 may present information and/or data (e.g., statistics) associated with a controlling device/user, for instance, to indicate a ranking of the controller (e.g., number of successful controls), types of modifications made on a restless device, locations of the controls made, devices controlled, and the like. In one embodiment, one or more controlling users and/or devices may determine a point system, a game system, an entertainment system, and the like wherein the controlling devices/users may compete, participate, challenge, and the like.

FIG. 10 illustrates a UI 1000 wherein various user and user device information in spatial area 1001 are presented in a map view. In one embodiment, location of a user/device 1003, and restless devices 1005a and 1005b (restless devices) shown on a map of the spatial area (e.g., an office area). In various embodiments, the user 1003 may proceed to the locations of the restless devices to interact with the devices and/or may utilize device 1003 to control the restless devices. In various embodiments, the user 1003 may utilize a UI at the device 1003 to request for more information about the restless devices via P2P communication links with the restless devices and/or via a local and/or a remote service provider. In one embodiment, the UI 1000 may present information related to various zones in the spatial area 1001; for example zones, 1007, 1009a-1009c, 1011a-1011b, 1013a-1013c. In one embodiment, one or more graphical effects, for example, coloring, texturing, highlighting, and the like may be utilized to provide additional information for one or more of the zones in the 1001 spatial area. For example, the graphical effects may indicate level of restless device activities in each zone, for instance, number of restless device occurrences per zone, comparison of the zones with respect to restless activities (e.g., unattended notifications, restless devices, etc.) in each zone, restless activities per a defined area (e.g., in a meeting room, etc.), and the like.

The processes described herein for providing mechanisms to control unattended notifications at a device may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
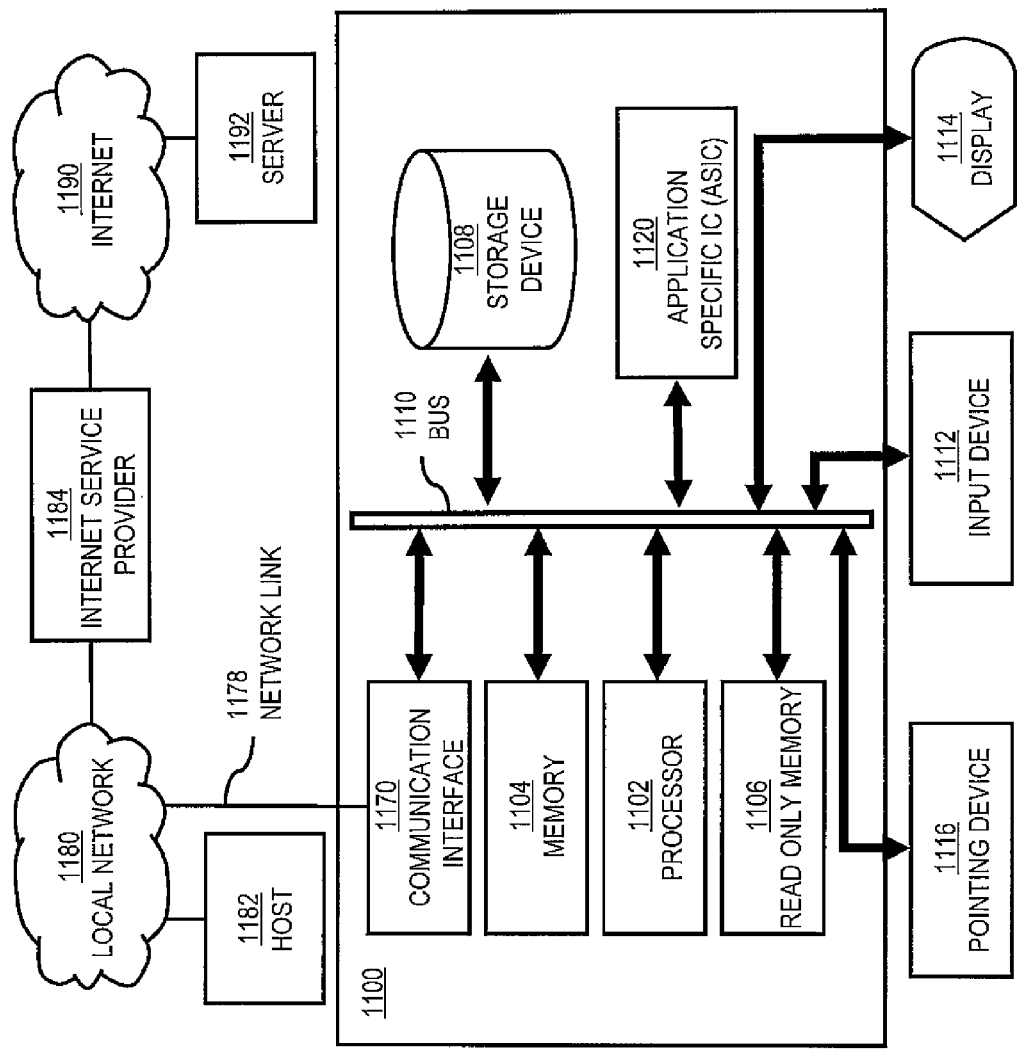
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide mechanisms to control unattended notifications at a device as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing mechanisms to control unattended notifications at a device.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing mechanisms to control unattended notifications at a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing mechanisms to control unattended notifications at a device. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing mechanisms to control unattended notifications at a device, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114, and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communication interface 1170 coupled to bus 1110. Communication interface 1170 provides a one-way or two-way communication coupling to a variety of external devices that operate with their own processors, such as printers, scanners, and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communication interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communication interface 1170 may be a local area network (LAN) card to provide a data communication connection to a compatible LAN, such as Ethernet. Wireless links may also be implemented. For wireless links, the communication interface 1170 sends or receives or both sends and receives electrical, acoustic, or electromagnetic signals, including infrared and optical signals that carry information streams, such as digital data. For example, in wireless handheld devices, such as mobile telephones like cell phones, the communication interface 1170 includes a radio band electromagnetic transmitter and receiver called a radio transceiver. In certain embodiments, the communication interface 1170 enables connection to the communication network 113 for providing mechanisms to control unattended notifications at a device.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communication interface 1170, carry information to and from computer system 1100. Computer system 1100 can send and receive information, including program code, through the networks 1180, 1190 among others, through network link 1178 and communication interface 1170. In an example using the Internet 1190, a server host 1192 transmits program code for a particular application, requested by a message sent from computer 1100, through Internet 1190, ISP equipment 1184, local network 1180, and communication interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communication interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed providing mechanisms to control unattended notifications at a device as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing mechanisms to control unattended notifications at a device.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide mechanisms to control unattended notifications at a device. The memory 1205 also stores the data associated with or generated by the execution of the inventive steps.

Figure 13:
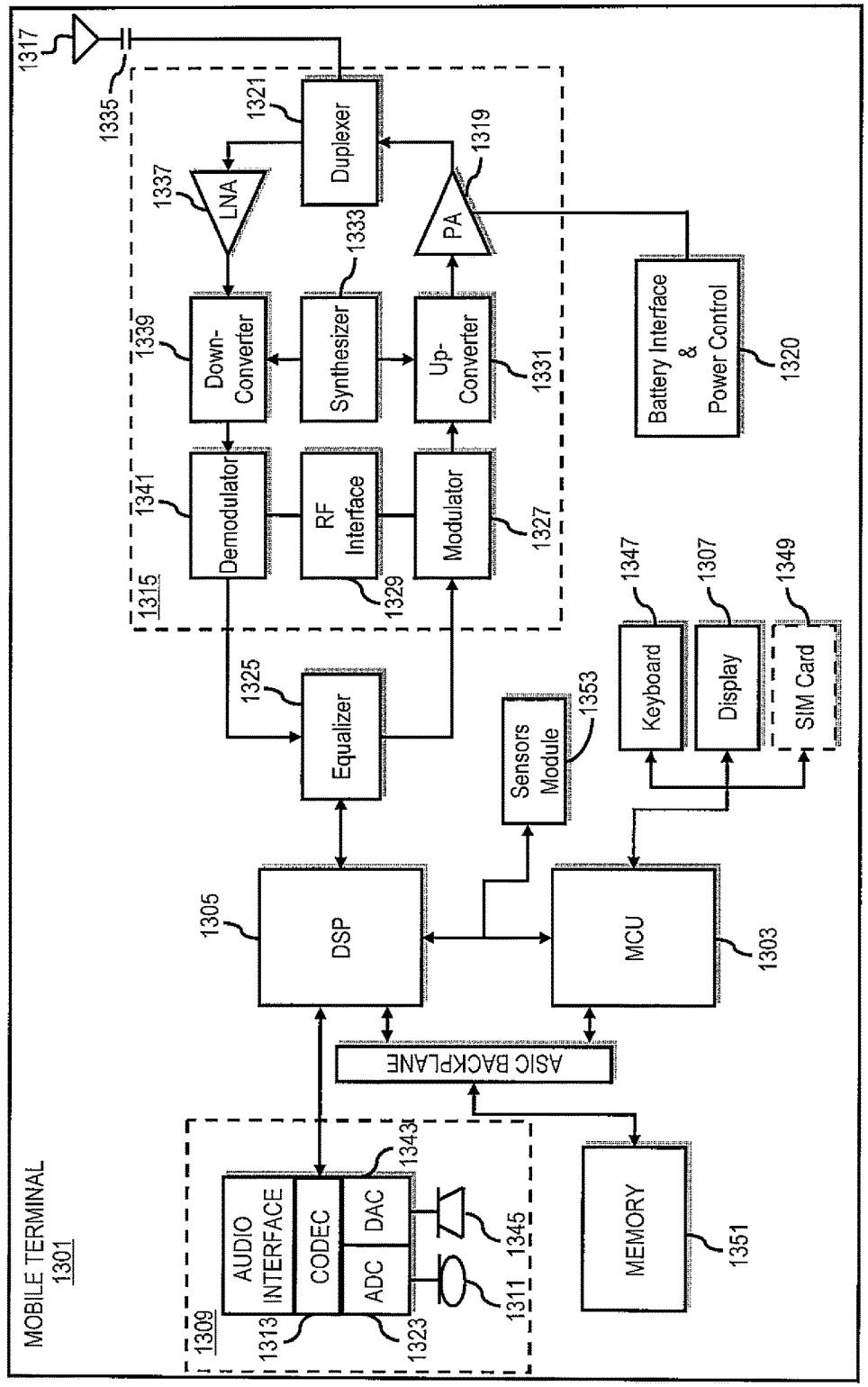
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing mechanisms to control unattended notifications at a device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing mechanisms to control unattended notifications at a device. The display 1307 includes display circuitry configured to display at least a portion of a user interface of the mobile terminal (e.g., mobile telephone). Additionally, the display 1307 and display circuitry are configured to facilitate user control of at least some functions of the mobile terminal An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 for providing mechanisms to control unattended notifications at a device. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Additionally, sensors module 1353 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1301 (e.g., a mobile phone), a user of the mobile terminal 1301, an environment of the mobile terminal 1301 and/or the user, or a combination thereof, wherein the data may be collected, processed, stored, and/or shared with one or more components and/or modules of the mobile terminal 1301 and/or with one or more entities external to the mobile terminal 1301.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a device, that at least one notification presented at the device is an unattended notification;
   discovering one or more other devices using one or more local connectivity on an initiation of a presentation of the at least one notification;
   in response to determining that the at least one notification at the device is unattended, providing, by the device, the one or more other devices with one or more mechanisms for controlling the unattended notification; and
   providing an indicator tag for disabling the one or more mechanisms.

2. A method of claim 1, further comprising:
   establishing at least one communication session between the device and the one or more other devices,
   wherein the one or more mechanisms operate, at least in part, over the at least one communication session.

3. A method of claim 2, wherein the at least one communication session is a peer-to-peer communication session.

4. A method of claim 1, further comprising:
   determining that the at least one notification is an unattended notification based, at least in part, on a repetition of the at least one notification, a duration of the at least one notification, or a combination thereof.

5. A method of claim 4, further comprising:
   processing one or more messages, from the one or more other devices, associated with the at least one notification; and
   presenting one or more of the one or more messages to one or more users of the device based, at least in part, on the repetition of the at least one notification, the duration of the at least one notification, or a combination thereof.

6. A method of claim 1, further comprising:
   determining that the at least one notification is an unattended notification based, at least in part, on presence information, proximity information, or a combination thereof of one or more users associated with the device.

7. A method of claim 1, further comprising:
   determining that the at least one notification is an unattended notification based, at least in part, on contextual information associated with an initiator of the at least one notification, the device, the one or more other devices, or a combination thereof.

8. A method of claim 1, further comprising:
presenting one or more parameters for effectuating the at least one notification based, at least in part, on the at least one notification, one or more capabilities of the device, one or more user profiles at the devices, one or more user profiles at the one or more other devices, one or more social connectivity among the device and the one or more other devices, or a combination thereof.

9. An apparatus comprising:
at least one processor; and
at least one memory including computer program code for one or more programs, the at least one memory and the computer program code configured to, with the at least one processor, cause the apparatus to perform at least the following,
determining, by a device, that at least one notification presented at the device is an unattended notification;
discovering one or more other devices using one or more local connectivity on an initiation of a presentation of the at least one notification;
in response to determining that the at least one notification at the device is unattended, providing, by the device, the one or more other devices with one or more mechanisms for controlling the unattended notification; and
providing an indicator tag for disabling the one or more mechanisms.

10. An apparatus of claim 9, wherein the apparatus is further caused to:
establish at least one communication session between the device and the one or more other devices,
wherein the one or more mechanisms operate, at least in part, over the at least one communication session.

11. An apparatus of claim 10, wherein the at least one communication session is a peer-to-peer communication session.

12. An apparatus of claim 9, wherein the apparatus is further caused to:
determine that the at least one notification is an unattended notification based, at least in part, on a repetition of the at least one notification, a duration of the at least one notification, or a combination thereof.

13. An apparatus of claim 12, wherein the apparatus is further caused to:
process of one or more messages, from the one or more other devices, associated with the at least one notification; and
present one or more of the one or more messages to one or more users of the device based, at least in part, on the repetition of the at least one notification, the duration of the at least one notification, or a combination thereof.

14. An apparatus of claim 9, wherein the apparatus is further caused to:
determine that the at least one notification is an unattended notification based, at least in part, on presence information, proximity information, or a combination thereof of one or more users associated with the device.

15. An apparatus of claim 9, wherein the apparatus is further caused to:
determine that the at least one notification is an unattended notification based, at least in part, on contextual information associated with an initiator of the at least one notification, the device, the one or more other devices, or a combination thereof.

16. An apparatus of claim 9, wherein the apparatus is further caused to:
present one or more parameters for effectuating the at least one notification based, at least in part, on the at least one notification, one or more capabilities of the device, one or more user profiles at the devices, one or more user profiles at the one or more other devices, one or more social connectivity among the device and the one or more other devices, or a combination thereof.

17. A non-transitory computer program product including one or more sequences of one or more instructions which, when executed by one or more processors, cause an apparatus to at least perform the steps of:
determining, by a device, that at least one notification presented at the device is an unattended notification;
discovering one or more other devices using one or more local connectivity on an initiation of a presentation of the at least one notification;
in response to determining that the at least one notification at the device is unattended, providing, by the device, the one or more other devices with one or more mechanisms for controlling the unattended notification; and
providing an indicator tag for disabling the one or more mechanisms.

18. A non-transitory computer program product of claim 17, wherein the apparatus is caused, at least in part, to further perform:
establishing at least one communication session between the device and the one or more other devices,
wherein the one or more mechanisms operate, at least in part, over the at least one communication session.

* * * * *